US012588078B2

(12) United States Patent
Shrestha et al.

(10) Patent No.: US 12,588,078 B2
(45) Date of Patent: Mar. 24, 2026

(54) MEASUREMENT TIMES FOR RADIO RESOURCE MANAGEMENT

(71) Applicant: QUALCOMM Incorporated, San Diego, CA (US)

(72) Inventors: Bharat Shrestha, San Diego, CA (US); Ayan Sengupta, San Diego, CA (US); Xiao Feng Wang, San Diego, CA (US); Umesh Phuyal, San Diego, CA (US); Le Liu, Fremont, CA (US); Prasad Reddy Kadiri, San Diego, CA (US); Mungal Singh Dhanda, Slough (GB); Alberto Rico Alvarino, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/451,063

(22) Filed: Oct. 15, 2021

(65) Prior Publication Data

US 2022/0132565 A1 Apr. 28, 2022

Related U.S. Application Data

(60) Provisional application No. 63/198,491, filed on Oct. 22, 2020.

(51) Int. Cl.
*H04W 74/0833* (2024.01)
*H04W 24/10* (2009.01)
(Continued)

(52) U.S. Cl.
CPC ......... *H04W 74/085* (2013.01); *H04W 24/10* (2013.01); *H04W 72/0453* (2013.01);
(Continued)

(58) Field of Classification Search
None
See application file for complete search history.

(56) References Cited

U.S. PATENT DOCUMENTS

| | | | | |
|---|---|---|---|---|
| 2011/0116364 A1* | 5/2011 | Zhang | .................. | H04W 74/08 370/216 |
| 2012/0172048 A1* | 7/2012 | Kato | .................... | H04L 5/0007 455/450 |

(Continued)

FOREIGN PATENT DOCUMENTS

WO WO-2020067973 A1 4/2020

OTHER PUBLICATIONS

Huawei, et al., "Discussion on SSB Measurement in NTN", 3GPP Draft, 3GPP TSG-RAN2 Meeting #108, R2-1915189, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019 Nov. 8, 2019 (Nov. 8, 2019), XP051817074, pp. 1-5, Retrieved from the Internet: URL: https://ftp.3gpp.org/tsg_ran/WG2_RL2/TSGR2_108/ Docs/R2- 1915189.zip R2-1915189 Discussion on SSB measurement in NTN.doc [retrieved on Nov. 8, 2019].

(Continued)

*Primary Examiner* — Saumit Shah
(74) *Attorney, Agent, or Firm* — Harrity & Harrity, LLP

(57) ABSTRACT

Various aspects of the present disclosure generally relate to wireless communication. In some aspects, a user equipment (UE) may receive, from a wireless communication device, a measurement time indication for measuring at least one signal associated with at least one inter-frequency neighbor cell. The UE may receive the at least one signal associated with the at least one inter-frequency neighbor cell based at least in part on the measurement time indication. Numerous other aspects are provided.

30 Claims, 11 Drawing Sheets

600 ——▸

610 ⌐ Receive, from a wireless communication device, a measurement time indication for measuring at least one signal associated with at least one inter-frequency neighbor cell 620 ⌐ Receive the at least one signal associated with the at least one inter-frequency neighbor cell based at least in part on the measurement time indication

(51) Int. Cl.

| | |
|---|---|
| *H04W 72/0453* | (2023.01) |
| *H04W 74/00* | (2009.01) |
| *H04W 74/08* | (2009.01) |
| *H04W 84/06* | (2009.01) |

(52) U.S. Cl.
CPC ..... *H04W 74/006* (2013.01); *H04W 74/0866* (2013.01); *H04W 84/06* (2013.01)

(56) References Cited

U.S. PATENT DOCUMENTS

| | | | | |
|---|---|---|---|---|
| 2013/0235743 | A1 | 9/2013 | Goldhamer | |
| 2014/0341192 | A1 | 11/2014 | Venkob et al. | |
| 2016/0337916 | A1* | 11/2016 | Deenoo | H04W 8/22 |
| 2019/0101615 | A1* | 4/2019 | Tenny | G01S 5/10 |
| 2019/0150015 | A1 | 5/2019 | Wei et al. | |
| 2020/0313991 | A1* | 10/2020 | Li | H04L 43/067 |
| 2021/0298038 | A1* | 9/2021 | Kang | H04L 5/0057 |
| 2022/0046498 | A1* | 2/2022 | Cheng | H04B 7/18519 |
| 2022/0263569 | A1* | 8/2022 | Fan | H04W 56/001 |
| 2022/0303811 | A1* | 9/2022 | Kakishima | H04W 16/28 |
| 2022/0353714 | A1* | 11/2022 | Fu | H04W 56/0015 |
| 2023/0115662 | A1* | 4/2023 | Li | H04W 36/0088 370/331 |
| 2023/0123943 | A1* | 4/2023 | Yokokawa | H04W 88/02 370/252 |
| 2023/0412257 | A1* | 12/2023 | Rasool | H04B 7/18521 |
| 2025/0280432 | A1* | 9/2025 | Gordaychik | H04W 28/16 |

OTHER PUBLICATIONS

International Search Report and Written Opinion—PCT/US2021/071916—ISA/EPO—Jan. 27, 2022.

OPPO: "Discussion on Mobility Management for Connected Mode UE in NTN", 3GPP Draft, 3GPP TSG-RAN WG2 Meeting #111-e, R2-2006784, 3rd Generation Partnership Project (3GPP), Mobile Competence Centre, 650, Route Des Lucioles, F-06921 Sophia-Antipolis Cedex, France, vol. RAN WG2, No. Electronic, Aug. 17, 2020-Aug. 28, 2020 Aug. 7, 2020 (Aug. 7, 2020), XP051911691, pp. 1-4, Retrieved from the Internet: URL: https://ftp.3gpp.org/tsg_ran/WG2_RL2/TSGR2_111-e/Docs/R2-2006784.zip R2-2006784 NTN Connected Mode Mobility.doc [retrieved on Aug. 7, 2020] p. 3.

Ericsson: Idle Mode Aspects for NTN', 3GPP TSG-RAN WG2 Meeting #111, Tdoc R2-2007558, E-meeting, Aug. 17, 2020-Aug. 28, 2020, Aug. 6, 2020, pp. 1-6.

\* cited by examiner

610   Receive, from a wireless communication device, a measurement time indication for measuring at least one signal associated with at least one inter-frequency neighbor cell 620   Receive the at least one signal associated with the at least one inter-frequency neighbor cell based at least in part on the measurement time indication

600

700

710 Transmit, to a user equipment (UE), a measurement time indication for measuring at least one signal associated with at least one inter-frequency neighbor cell 720 Refrain from transmitting a signal to the UE during a measurement time based at least in part on the measurement time indication

MEASUREMENT TIMES FOR RADIO RESOURCE MANAGEMENT

CROSS-REFERENCE TO RELATED APPLICATION

This patent application claims priority to U.S. Provisional Patent Application No. 63/198,491, filed on Oct. 22, 2020, entitled "MEASUREMENT TIMES FOR RADIO RESOURCE MANAGEMENT," and assigned to the assignee hereof. The disclosure of the prior application is considered part of and is incorporated by reference into this patent application.

INTRODUCTION

Aspects of the present disclosure generally relate to wireless communication and to techniques and apparatuses for providing measurement times for radio resource management.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes receiving, from a wireless communication device, a measurement time indication for measuring at least one signal associated with at least one inter-frequency neighbor cell; and receiving the at least one signal associated with the at least one inter-frequency neighbor cell based at least in part on the measurement time indication.

In some aspects, a method of wireless communication performed by a wireless communication device includes transmitting, to a UE, a measurement time indication for measuring at least one signal associated with at least one inter-frequency neighbor cell; and refraining from transmitting a signal to the UE during a measurement time based at least in part on the measurement time indication.

In some aspects, a UE for wireless communication includes a memory; and one or more processors coupled to the memory, the one or more processors configured to: receive, from a wireless communication device, a measurement time indication for measuring at least one signal associated with at least one inter-frequency neighbor cell; and receive the at least one signal associated with the at least one inter-frequency neighbor cell based at least in part on the measurement time indication.

In some aspects, a wireless communication device for wireless communication includes a memory; and one or more processors coupled to the memory, the one or more processors configured to: transmit, to a UE, a measurement time indication for measuring at least one signal associated with at least one inter-frequency neighbor cell; and refrain from transmitting a signal to the UE during a measurement time based at least in part on the measurement time indication.

In some aspects, a non-transitory computer-readable medium storing a set of instructions for wireless communication includes one or more instructions that, when executed by one or more processors of a UE, cause the UE to: receive, from a wireless communication device, a measurement time indication for measuring at least one signal associated with at least one inter-frequency neighbor cell; and receive the at least one signal associated with the at least one inter-frequency neighbor cell based at least in part on the measurement time indication.

In some aspects, a non-transitory computer-readable medium storing a set of instructions for wireless communication includes one or more instructions that, when executed by one or more processors of a wireless communication device, cause the wireless communication device to: transmit, to a UE, a measurement time indication for measuring at least one signal associated with at least one inter-frequency neighbor cell; and refrain from transmitting a signal to the UE during a measurement time based at least in part on the measurement time indication.

In some aspects, an apparatus for wireless communication includes means for receiving, from a wireless communication device, a measurement time indication for measuring at least one signal associated with at least one inter-frequency neighbor cell; and means for receiving the at least one signal associated with the at least one inter-frequency neighbor cell based at least in part on the measurement time indication.

In some aspects, an apparatus for wireless communication includes means for transmitting, to a UE, a measurement time indication for measuring at least one signal associated with at least one inter-frequency neighbor cell; and means for refraining from transmitting a signal to the UE during a measurement time based at least in part on the measurement time indication.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
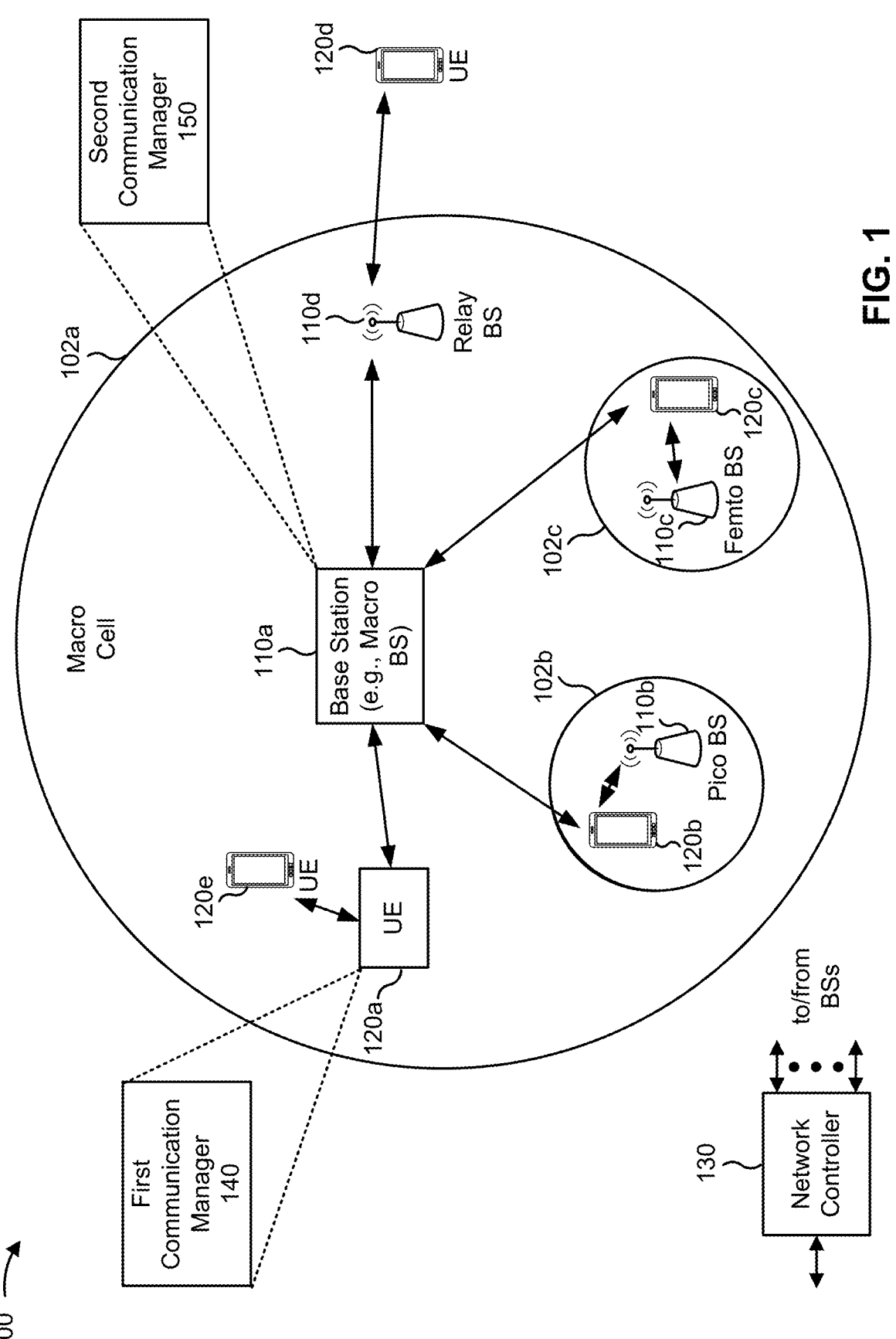
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), and/or a relay station (referred to herein, interchangeably, as a "non-terrestrial relay station"), among other examples. As used herein, "NTN" may refer to a network for which access is facilitated by a non-terrestrial UE, non-terrestrial BS, and/or a non-terrestrial relay station, among other examples.

The wireless network 100 may include any number of non-terrestrial wireless communication devices. A non-terrestrial wireless communication device may include a satellite, a manned aircraft system, and/or an unmanned aircraft system (UAS) platform, among other examples. A satellite may include a low-earth orbit (LEO) satellite, a medium-earth orbit (MEO) satellite, a geostationary earth orbit (GEO) satellite, and/or a high elliptical orbit (HEO) satellite, among other examples. A manned aircraft system may include an airplane, helicopter, and/or a dirigible, among other examples. A UAS platform may include a high-altitude platform station (HAPS), and may include a balloon, a dirigible, and/or an airplane, among other examples. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, and/or one or more components and/or devices included in a core network of wireless network 100, among other examples.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, and/or a central unit, among other examples. An IAB network may include one or more non-anchor base stations, sometimes referred to as relay base stations, IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming and/or precoding, among other examples) for communications between base stations and/or UEs (e.g., between two base stations, between two UEs, and/or between a base station and a UE). For example, wireless backhaul links between base stations may use millimeter waves to carry information and/or may be directed toward a target base station using beamforming and/or precoding, among other examples. Similarly, wireless access links between a UE and a base station may use millimeter waves and/or may be directed toward a target wireless node (e.g., a UE and/or a base station). In this way, inter-link interference may be reduced.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a first communication manager 140. As described in more detail elsewhere herein, the first communication manager 140 may receive, from a wireless communication device that provides a serving cell, a measurement time indication for measuring at least one signal associated with at least one inter-frequency neighbor cell; and receive the at least one signal associated with the at least one inter-frequency neighbor cell based at least in part on the measurement time indication. Additionally, or alternatively, the first communication manager 140 may perform one or more other operations described herein.

In some aspects, the base station 110 may include a second communication manager 150. As described in more detail elsewhere herein, the second communication manager 150 may transmit, to a UE that is served by a serving cell provided by the wireless communication device, a measurement time indication for measuring at least one signal associated with at least one inter-frequency neighbor cell; and refrain from transmitting a signal to the UE during a measurement time based at least in part on the measurement time indication. Additionally, or alternatively, the second communication manager 150 may perform one or more other operations described herein.

As indicated above, FIG. 1 is provided merely as an example. Other examples may differ from what is described with regard to FIG. 1.

Figure 2:
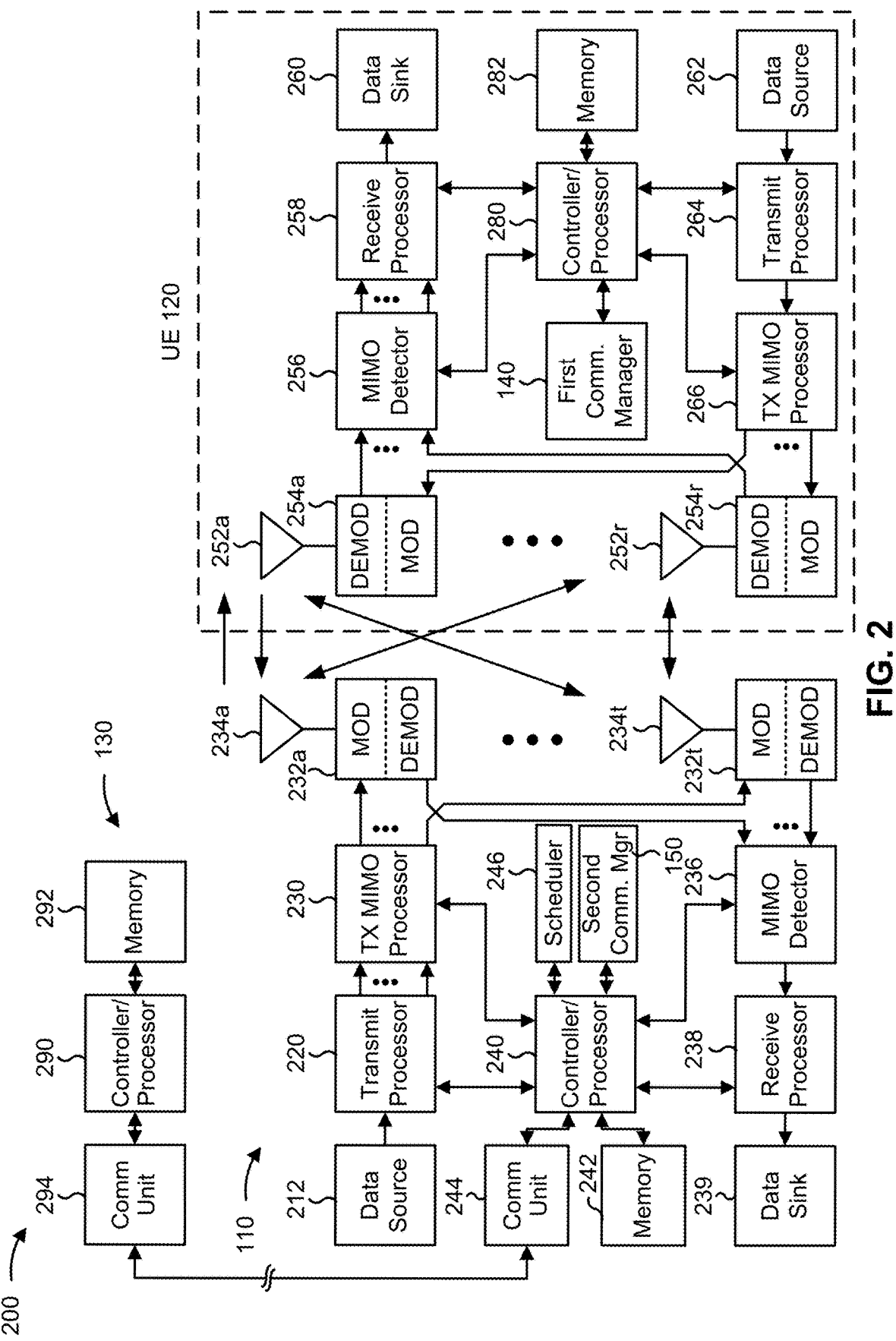
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/ or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-11.

Controller/processor 240 of base station 110, controller/ processor 280 of UE 120, and/or any other component(s) of FIG. 2 may perform one or more techniques associated with providing measurement times for radio resource management (RRM), as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving, from a base station that provides a serving cell, a measurement time indication for measuring at least one signal associated with at least one inter-frequency neighbor cell and/or means for receiving the at least one signal associated with the at least one inter-frequency neighbor cell based at least in part on the measurement time indication, among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258, among other examples.

In some aspects, a wireless communication device (e.g., base station 110) may include means for transmitting, to a UE that is served by a serving cell provided by the wireless communication device, a measurement time indication for measuring at least one signal associated with at least one inter-frequency neighbor cell and/or means for refraining from transmitting a signal to the UE during a measurement time based at least in part on the measurement time indication, among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234, among other examples.

While blocks in FIG. 2 are illustrated as distinct compo-nents, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
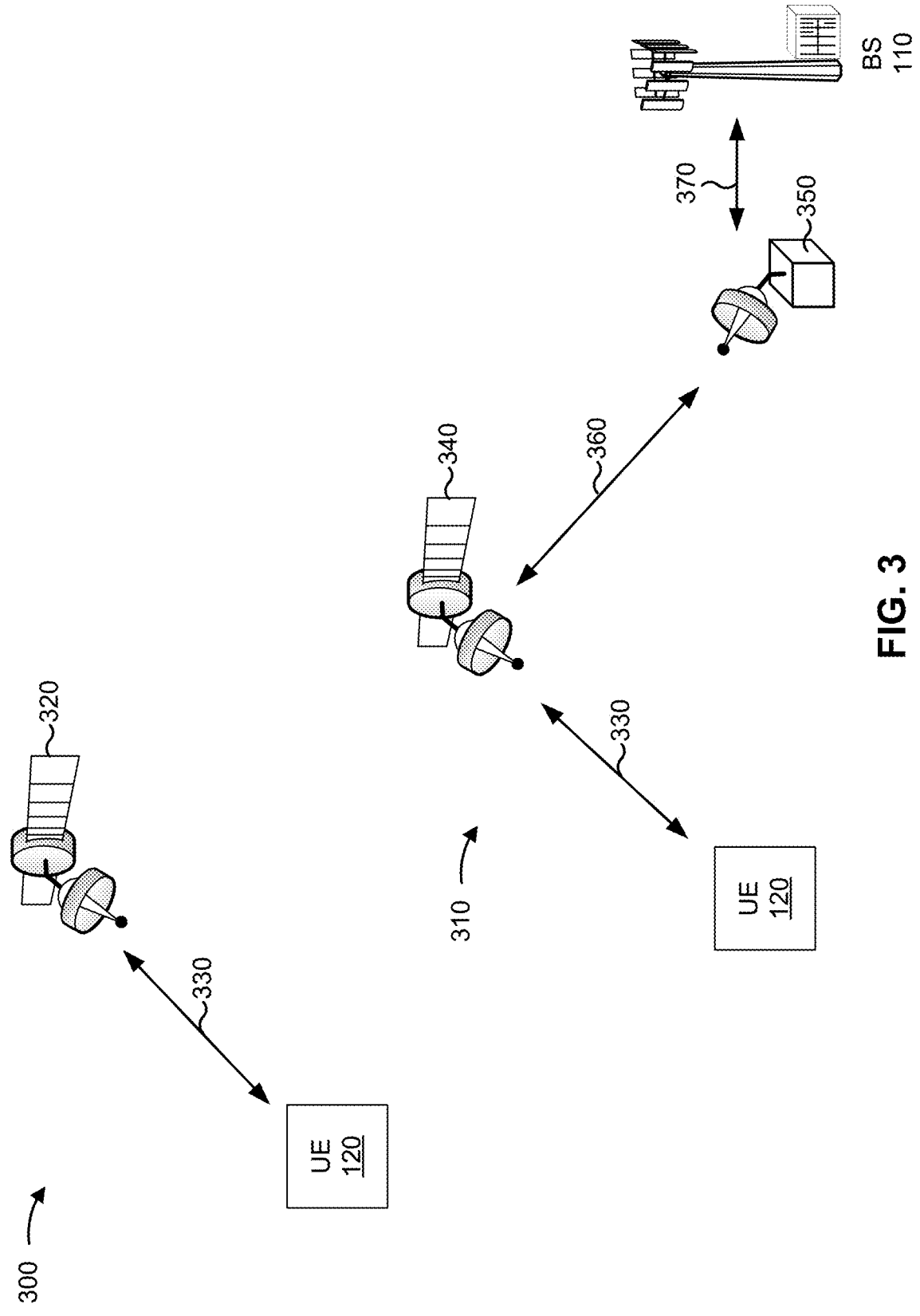
FIG. 3 is a diagram illustrating an example of a regenerative satellite deployment and an example of a transparent satellite deployment in a non-terrestrial network (NTN), in accordance with the present disclosure.

FIG. 3 is a diagram illustrating examples 300 and 310 of NTN deployments. The example 300 and/or the example 310 may be, be similar to, include, or be included in, a wireless network such as the wireless network 100 shown in, and described in connection with, FIG. 1.

Example 300 shows a regenerative satellite deployment. In example 300, a UE 120 is served by a satellite 320 via a service link 330. For example, the satellite 320 may include a BS 110 (e.g., BS 110a), a gNB, and/or one or more functions (e.g., radio frequency (RF) filtering, frequency conversion, amplification, demodulation, decoding, switch-ing, routing, coding, and/or modulation, among other examples) of a BS 110, among other examples. The service link 330 may include an NR-Uu interface that is terminated at the satellite 320. In some aspects, the satellite 320 may be referred to as a non-terrestrial base station, a regenerative repeater, and/or an on-board processing repeater, among other examples. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be referred to as a transparent satellite, a bent-pipe satellite, and/or a non-terrestrial relay station, among other examples. The satellite 340 may relay a signal received from a terres-trial BS 110, via an NTN gateway 350. The satellite may repeat an NR-Uu interface via a feeder link 360. The NTN gateway 350 may communicatively connect the satellite 340 and the BS 110 using an RF link 370. For example, the satellite 340 may receive an uplink radio frequency trans-mission, and may transmit a downlink radio frequency transmission without demodulating the uplink radio fre-quency transmission. In some aspects, the satellite 340 may frequency convert the uplink radio frequency transmission received on the service link 330 to a frequency of the downlink radio frequency transmission on the feeder link 360, and may amplify and/or filter the uplink radio fre-quency transmission. In some aspects, the UEs 120 shown in example 300 and example 310 may be associated with a Global Navigation Satellite System (GNSS) capability, and/or a Global Positioning System (GPS) capability, among other examples, though not all UEs have such capabilities. The satellite 340 may provide and/or facilitate a cell that covers the UE 120.

The service link 330 may include a link between the satellite 340 and the UE 120, and may include one or more of an uplink or a downlink. The feeder link 360 may include a link between the satellite 340 and the gateway 350, and may include one or more parts of an uplink (e.g., from the UE 120 to the gateway 350) or a downlink (e.g., from the gateway 350 to the UE 120).

As indicated above, FIG. 3 is provided as an example. Other examples may differ from what is described with regard to FIG. 3.

Figure 4:
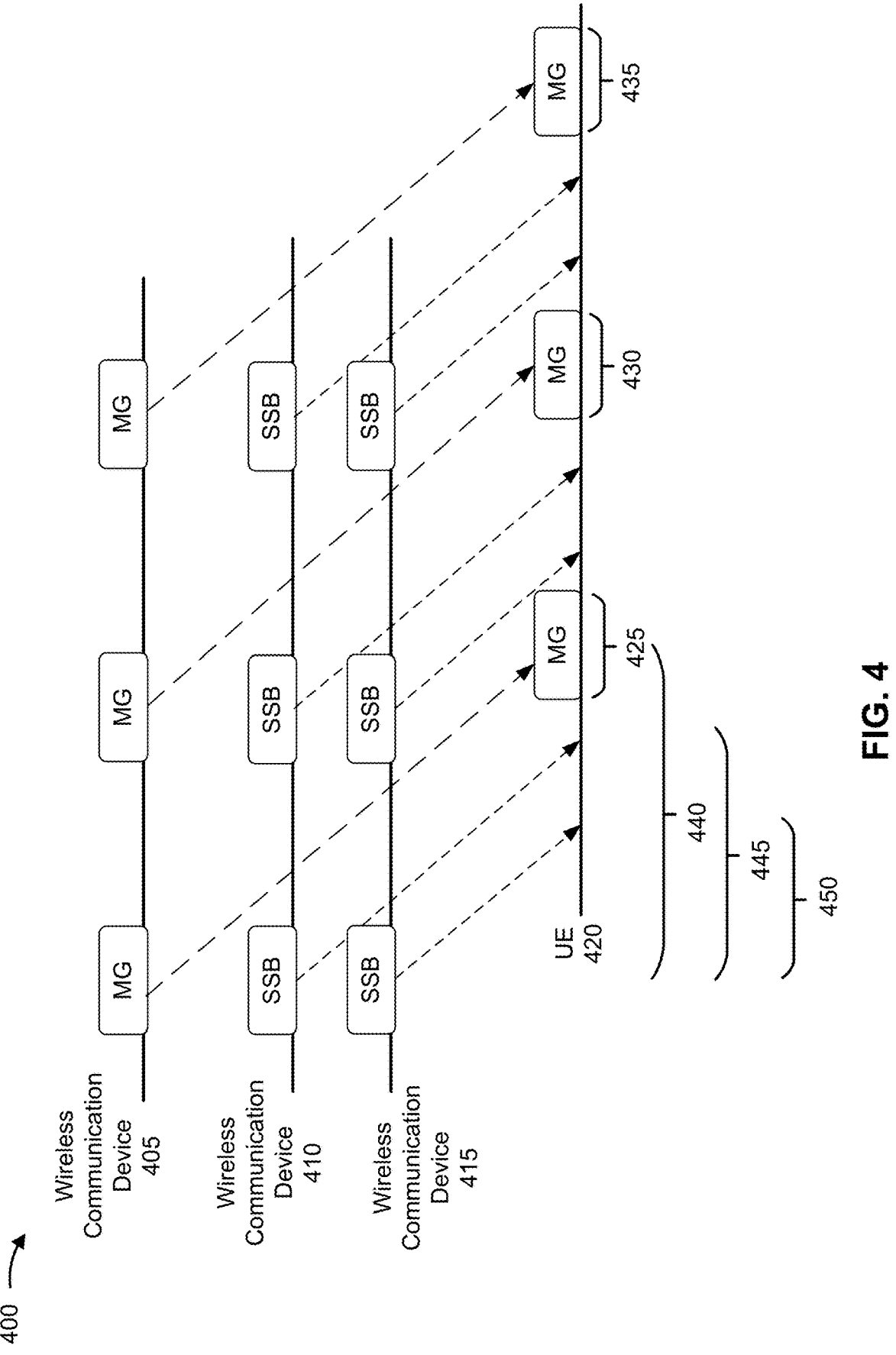
FIG. 4 is a diagram illustrating an example of measurement gap management in an NTN, in accordance with the present disclosure.

FIG. 4 is a diagram illustrating an example 400 of measurement gap configuration in an NTN, in accordance with the present disclosure. As shown in FIG. 4, a number of wireless communication devices 405, 410, and 415 and a UE 420 may communicate with one another. The wireless communication devices 405, 410, and/or 415 may include non-terrestrial base stations and/or non-terrestrial relay devices, among other examples. The wireless communica-tion device 405, 410, and/or 415 may, for example, provide cells for communication.

In the example, the wireless communication device 405 may provide a serving cell to the UE 420. The wireless communication device 405 may configure a measurement gap (shown as "MG", also referred to as a configured measurement gap) for use, by the UE 420, in measuring signals associated with one or more neighbor cells (e.g., provided by the wireless communication devices 410 and/or 415, respectively) to determine whether to perform a han-dover procedure to switch from the serving cell to a neighbor cell. As shown, the measurement gap may be configured to occur during a first time period 425, a second time period 430, a third time period 435, and so on. In some cases, a UE 420 may be configured with only one recurring measure-ment gap.

In NTN implementations, the UE 420 may experience a first propagation delay 440 with respect to the serving cell and a second, different, propagation delay 445 associated with a first neighbor cell (provided by the wireless commu-nication device 410) due to large differences in velocity between the wireless communication devices 405 and 410 providing the cells. The UE 420 may experience a third propagation delay 450 associated with a second neighbor cell (provided by the wireless communication device 415), and so on. As a result, the configured measurement gap may not be effective for facilitating measurement of signals associated with inter-frequency neighbor cells for radio resource management measurements.

Aspects of techniques and apparatuses described herein facilitate providing a measurement time during which a UE may perform radio resource management measurements associated with an inter-frequency neighbor cell provided by a non-terrestrial wireless communication device. In some aspects, the wireless communication device may provide, to the UE, a measurement time indication for measuring at least one signal associated with at least one inter-frequency neighbor cell. In this way, aspects may enable radio resource management measurements to be performed by a UE in association with NTNs. As a result, aspects may facilitate enabling switching between cells provided by non-terrestrial devices, and/or improving the performance of NTN com-munications, among other examples.

As indicated above, FIG. 4 is provided as an example. Other examples may differ from what is described with respect to FIG. 4.

Figure 5:
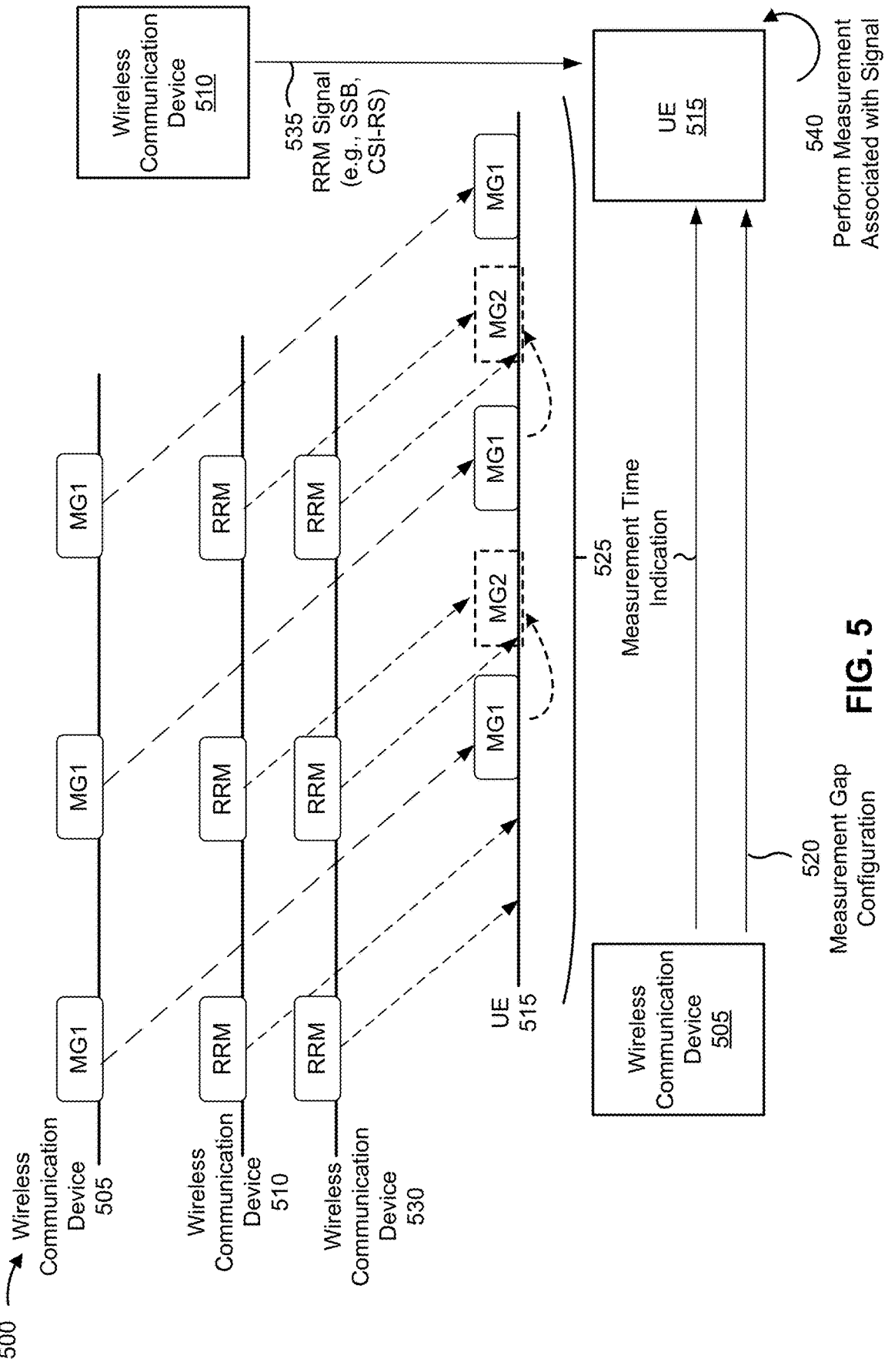
FIG. 5 is a diagram illustrating an example associated with providing measurement times for radio resource management, in accordance with the present disclosure.

FIG. 5 is a diagram illustrating an example 500 of providing measurement times for radio resource manage-ment, in accordance with the present disclosure. As shown in FIG. 5, a wireless communication device 505, a wireless communication device 510, and a UE 515 may communicate with one another. The wireless communication device 505 and/or 510 may include non-terrestrial base stations, and/or non-terrestrial relay devices, among other examples. The wireless communication device 505 and/or 510 may, for example, provide cells for wireless communication. In some aspects, for example, the wireless communication device 505 may provide a serving cell. The wireless communication device 510 may include an inter-frequency neighbor cell. An inter-frequency neighbor cell may be a cell that neighbors a serving cell and includes an operating frequency that is different than an operating frequency of the serving cell.

As show by reference number 520, the wireless communication device 505 may transmit, and the UE 515 may receive, a measurement gap configuration. For example, the measurement gap configuration may be carried using a radio resource control (RRC) message, a downlink control information (DCI) transmission, or a medium access control (MAC) control element (MAC-CE). As shown by reference number 525, the wireless communication device 505 may transmit, and the UE 515 may receive, a measurement time indication. The measurement time indication may be included in an RRC communication, a MAC-CE, or DCI. The measurement time indication may indicate a time for measuring at least one signal associated with at least one inter-frequency neighbor cell (e.g., a cell provided by the wireless communication device 510). For example, the measurement time indication may indicate a measurement time that is determined so that an RRM signal transmitted by the at least one inter-frequency neighbor cell is received by the UE 515 during the measurement time.

In some aspects, as shown in FIG. 5, the measurement time indication may indicate a change from a configured measurement gap. For example, in some aspects, the measurement time indication may indicate a different measurement gap to be used in lieu of, or in addition to, the configured measurement gap. For example, the gap configuration may indicate a first measurement gap (shown as "MG1"), which may be a repeating measurement gap, as shown. The measurement time indication may include an indication of a second measurement gap (shown as "MG2") that is different than the first measurement gap. The indication of the second measurement gap may be carried in a scheduling DCI transmission. The second measurement gap may be configured so that an RRM signal transmitted by the wireless communication device 510 may be received by the UE 515 during the second measurement gap. As shown, the second measurement gap may be configured so that an RRM signal transmitted by a third wireless communication device 530 also is received by the UE 515 during the second measurement gap. In some aspects, the indication of the second measurement gap may include an indication to provide the second measurement gap during an offset time. The offset time may include a round-trip delay associated with a signal.

In some aspects, the measurement time indication may indicate an adjustment to a default measurement gap. The default measurement gap may be indicated by a wireless communication specification. The default measurement gap may include a common configuration associated with at least one of: a non-terrestrial device that provides the at least one inter-frequency neighbor cell or the at least one inter-frequency neighbor cell. For example, the wireless communication device 505 may transmit, and the UE 515 may receive, the common configuration. The common configuration may be carried using a system information block (SIB). The measurement time indication may indicate a time offset associated with the default measurement gap.

In some aspects, the measurement time indication may include scheduling for a measurement request. For example, the wireless communication device 505 and/or the wireless communication device 510 may transmit, and the UE 515 may receive, a measurement request. In some aspects, the measurement time indication may indicate the measurement request. The measurement request may be associated with a measurement of a signal associated with a cell identifier (ID) and/or a frequency. The measurement request may request more than one measurement, and may request that the measurements be reported together or separately. The measurement request may include the measurement time indication, or the measurement time indication may be transmitted separately. The measurement time indication may include a scheduling indication corresponding to the measurement request.

In some aspects, the measurement request may indicate at least one of: a cell identifier corresponding to the at least one inter-frequency neighbor cell, or a frequency corresponding to the at least one inter-frequency neighbor cell. The measurement request may include an indication to report one or more measurements together or separately. The scheduling indication may include an indication to perform a measurement during an offset time. An offset time refers to a time period beginning and/or ending at a time that is offset from another configured time. For example, the offset time may include a round-trip delay associated with a signal. In that case, the time period for measurement may begin after the indicated signal is transmitted and/or may end before the indicated signal (or a response thereto) is received.

In some aspects, the wireless communication device 505 may determine the measurement time based at least in part on location information and/or motion information. In some aspects, the wireless communication device 505 may determine location and/or motion information (e.g., velocity, acceleration) associated with the wireless communication device 510, and may use the determined information to determine a time period during which the UE 515 should measure an RRM signal transmitted by the wireless communication device 510. The RRM signal may include, for example, a synchronization signal block (SSB), and/or a channel state information reference signal (CSI-RS), among other examples. In some aspects, the wireless communication device 505 may determine the time period based at least in part on a location of the wireless communication device 510, a location of the UE 515, a motion of the wireless communication device 510, a motion of the UE 515, and/or a propagation delay, among other examples.

In some aspects, the UE 515 may assist the wireless communication device 505 in determining the time period to be indicated. In some aspects, the network may provide the measurement time indication during a random access channel (RACH) procedure. The indication may be provided, for example, in a random access response (RAR) message (also known as a message 2, Msg2, MSG2, or a second message) or in an RRC connection setup message (also known as a message 4, Msg4, MSG4, or a fourth message). In this case, the measurement time may be a timer configured for measurement. The measurement time may be indicated to occur during an offset time (e.g., during a round trip duration (RTD), between a downlink transmission and an uplink transmission). A gap between an RAR message and an RRC connection request message (also known as a message 3, Msg3, MSG3, a UE identification message, or a third message) or between a Msg4 and an acknowledgment message (also known as a message 5, Msg5, or a fifth message) may be used for RRM measurement as no uplink or downlink scheduling is expected during those times.

In some aspects, an SSB measurement time configuration (SMTC) corresponding to a configured measurement gap and/or an RSSI measurement timing configuration (RMTC) indication corresponding to at least one frequency associated with at least one inter-frequency neighbor cell may be indicated. In some aspects, the SMTC and/or the RMTC indication may be a list of cell IDs and/or frequencies and possible SSB locations.

For example, the measurement time indication may indicate at least one of: a list of cell identifiers corresponding to at least one inter-frequency neighbor cell, a frequency corresponding to the at least one inter-frequency neighbor cell, or a possible synchronization signal block location corresponding to the at least one inter-frequency neighbor cell. The UE 515 may search the neighbor cell and determine a measurement time parameter and may inform the network (e.g., by transmitting a report to the wireless communication device 505). The measurement time parameter may include at least one of: an adjustment corresponding to a configured measurement gap or an SMTC corresponding to a configured measurement gap.

In some aspects, for example, the UE 515 may report an indication of the adjustment in a Msg5 or at a later time, when the report is available. In some aspects, for example, the Msg5 may indicate that the report is not available. In some aspects, the UE 515 may transmit the indication of the measurement time parameter in an acknowledgment message (e.g., a Msg5) of a RACH procedure. The measurement time indication may be based at least in part on the measurement time parameter. In some aspects, the UE may transmit an acknowledgment message that indicates a report status associated with the indication of the measurement time.

The UE 515 may detect at least one of an SSB associated with the at least one inter-frequency neighbor cell or a reference signal associated with the at least one inter-frequency neighbor cell. The UE 515 may transmit an indication of a list of cell identifiers corresponding to the at least one inter-frequency neighbor cell. The measurement time indication may be based at least in part on the list of cell identifiers. In some aspects, the UE 515 may determine and transmit an indication of a differential delay of the at least one inter-frequency neighbor cell relative to the serving cell. The measurement time indication may be based at least in part on the differential delay.

In some aspects, the measurement time indication may indicate a plurality of measurement gap configurations. In some aspects, the measurement time indication may indicate a periodic schedule and/or a duty cycle associated with using one or more of the plurality of measurement gap configurations. In some aspects, the measurement time indication may indicate one or more measurement gap timing advances (MGTAs). In some aspects, the measurement time indication may indicate at least one of a periodic schedule and/or a duty cycle associated with applying one or more of one or more MGTAs. In this way, for example, a plurality of measurement gap configurations and/or MGTAs may be cycled through according to an indicated periodic schedule and/or duty cycle.

In some aspects, the measurement time indication may include an SMTC indication corresponding to at least one frequency associated with the at least one inter-frequency neighbor cell. The SMTC indication may indicate a list of cell IDs corresponding to at least one applicable neighbor cell, where the at least one applicable neighbor cell includes the at least one inter-frequency neighbor cell. The SMTC indication indicates a time offset associated with a configured SMTC window. The SMTC indication may indicate SSB numerology information associated with at least one applicable neighbor cell. In some aspects, the measurement time indication may indicate a new SMTC configuration that includes a positive offset value or a negative offset value associated with an SMTC window for one or more neighbor cells associated with a frequency. The offset value may correspond to a differential delay of the neighbor cell.

In some aspects, the wireless communication device 505 may transmit, and the UE 515 may receive a SMTC indication corresponding to at least one frequency associated with the at least one inter-frequency neighbor cell. The measurement time indication may include the SMTC indication. The measurement time indication may include a reference signal (RS) measurement indication corresponding to at least one frequency associated with the at least one inter-frequency neighbor cell.

In some aspects, a procedure similar to that described above may be used with CSI-RSs. For example, the RS measurement indication may indicate a list of cell IDs corresponding to at least one applicable neighbor cell. The at least one applicable neighbor cell may include the at least one inter-frequency neighbor cell. In some aspects, the wireless communication device 505 may transmit, and the UE 515 may receive, a RS measurement indication corresponding to at least one frequency associated with the at least one inter-frequency neighbor cell. The measurement time indication may include the RS measurement indication.

In some aspects, the measurement time indication may include an RMTC indication corresponding to at least one frequency associated with the at least one inter-frequency neighbor cell. The RMTC indication may indicate a list of cell IDs corresponding to at least one applicable neighbor cell, where the at least one applicable neighbor cell comprises the at least one inter-frequency neighbor cell. The RMTC indication may indicate a time offset associated with a configured RMTC window. The RMTC indication may indicate CSI-RS numerology information associated with at least one applicable neighbor cell. In some aspects, the wireless communication device 505 may transmit, and the UE 515 may receive, a RMTC indication corresponding to at least one frequency associated with the at least one inter-frequency neighbor cell. The measurement time indication may include the RMTC indication.

In some aspects, the measurement time indication may be carried using a RACH procedure message associated with a RACH procedure. The RACH procedure message may include at least one of: a RAR message (e.g., a Msg2), or an RRC connection setup message (e.g., a Msg4). The measurement time indication may include a timer configured to allow measuring the at least one signal during the RACH procedure. The measurement time indication may indicate a time period for measurement. The time period for measurement may correspond to an offset time. The offset time may include an RTD associated with a signal. The offset time may include a gap between a first RACH message and a second RACH message (e.g., a gap between a RAR message and an RRC connection setup message or a gap between a Msg4 and an acknowledgment message).

As shown by reference number 535, the wireless communication device 510 may transmit, and the UE 515 may receive, the RRM signal (e.g., an SSB and/or a CSI-RS). In some aspects, the UE 515 may receive a plurality of signals associated with a plurality of inter-frequency neighbor cells.

As shown by reference number 540, the UE 515 may perform one or more measurements associated with the RRM signal.

As indicated above, FIG. 5 is provided as an example. Other examples may differ from what is described with respect to FIG. 5.

Figure 6:
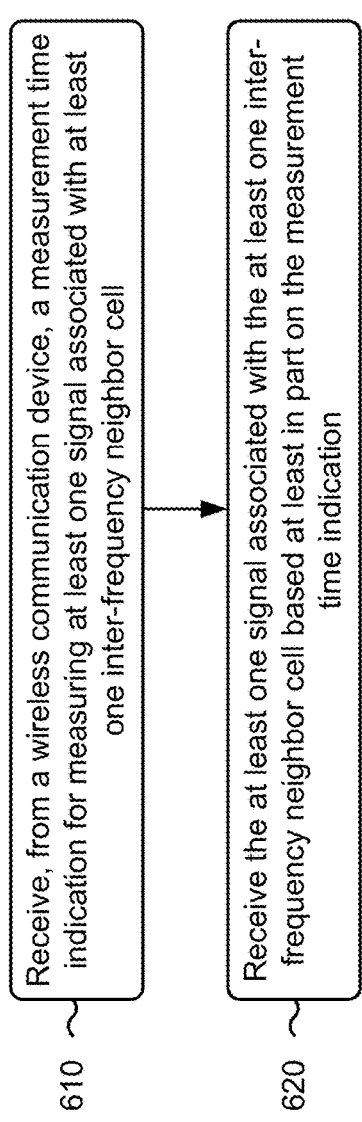
FIGS. 6 and 7 are diagrams illustrating example processes associated with providing measurement times for radio resource management, in accordance with the present disclosure.

FIG. 6 is a diagram illustrating an example process 600 performed, for example, by a UE, in accordance with the present disclosure. Example process 600 is an example where the UE (e.g., UE 515 shown in FIG. 5) performs operations associated with measurement times for RRM.

As shown in FIG. 6, in some aspects, process 600 may include receiving, from a wireless communication device that provides a serving cell, a measurement time indication for measuring at least one signal associated with at least one inter-frequency neighbor cell (block 610). For example, the UE (e.g., using reception component 802, depicted in FIG. 8) may receive, from a wireless communication device that provides a serving cell, a measurement time indication for measuring at least one signal associated with at least one inter-frequency neighbor cell, as described above.

As further shown in FIG. 6, in some aspects, process 600 may include receiving the at least one signal (e.g., an RRM signal) associated with the at least one inter-frequency neighbor cell based at least in part on the measurement time indication (block 620). For example, the UE (e.g., using reception component 802, depicted in FIG. 8) may receive the at least one signal associated with the at least one inter-frequency neighbor cell based at least in part on the measurement time indication, as described above.

Process 600 may include additional aspects, such as any single aspect or any combination of aspects described below and/or in connection with one or more other processes described elsewhere herein.

In a first aspect, the at least one signal comprises at least one of an SSB, or a CSI-RS.

In a second aspect, alone or in combination with the first aspect, the at least one signal associated with the at least one inter-frequency neighbor cell comprises a plurality of signals associated with a plurality of inter-frequency neighbor cells.

In a third aspect, alone or in combination with one or more of the first and second aspects, the measurement time indication is carried using at least one of an RRC message, a DCI transmission, or a MAC-CE.

In a fourth aspect, alone or in combination with one or more of the first through third aspects, the measurement time indication indicates a scheduled measurement gap that overrides a configured measurement gap.

In a fifth aspect, alone or in combination with one or more of the first through third aspects, the measurement time indication indicates a measurement gap of a plurality of configured measurement gaps.

In a sixth aspect, alone or in combination with one or more of the first through third aspects, the measurement time indication indicates an adjustment to a configured measurement gap.

In a seventh aspect, alone or in combination with the sixth aspect, the measurement time indication indicates a time offset associated with the configured measurement gap.

In an eighth aspect, alone or in combination with one or more of the first through seventh aspects, process 600 includes receiving a measurement request, wherein the measurement time indication comprises a scheduling indication corresponding to the measurement request.

In a ninth aspect, alone or in combination with the eighth aspect, the measurement request indicates at least one of a cell identifier corresponding to the at least one inter-frequency neighbor cell, or a frequency corresponding to the at least one inter-frequency neighbor cell.

In a tenth aspect, alone or in combination with the eighth aspect, the scheduling indication is carried in a scheduling DCI transmission.

In an eleventh aspect, alone or in combination with the eighth aspect, the scheduling indication comprises an indication to perform a measurement during an offset time.

In a twelfth aspect, alone or in combination with the eleventh aspect, the offset time comprises a round-trip delay associated with a signal.

In a thirteenth aspect, alone or in combination with one or more of the first through twelfth aspects, process 600 includes receiving a measurement gap configuration that indicates a first measurement gap, wherein the measurement time indication comprises an indication of a second measurement gap that is different than the first measurement gap.

In a fourteenth aspect, alone or in combination with one or more of the first through thirteenth aspects, the indication of the second measurement gap is carried in a scheduling DCI transmission.

In a fifteenth aspect, alone or in combination with the fourteenth aspect, the indication of the second measurement gap comprises an indication to provide the second measurement gap during an offset time.

In a sixteenth aspect, alone or in combination with the fifteenth aspect, the offset time comprises a round-trip delay associated with a signal.

In a seventeenth aspect, alone or in combination with one or more of the first through sixteenth aspects, the measurement time indication indicates an adjustment to a default measurement gap.

In an eighteenth aspect, alone or in combination with the seventeenth aspect, the default measurement gap is indicated by a wireless communication specification.

In a nineteenth aspect, alone or in combination with the seventeenth aspect, the default measurement comprises a common configuration associated with at least one of a non-terrestrial device that provides the at least one inter-frequency neighbor cell, or the at least one neighbor cell.

In a twentieth aspect, alone or in combination with the nineteenth aspect, process 600 includes receiving the common configuration.

In a twenty-first aspect, alone or in combination with the twentieth aspect, the common configuration is carried using a SIB.

In a twenty-second aspect, alone or in combination with the seventeenth aspect, the measurement time indication indicates a time offset associated with the default measurement gap.

In a twenty-third aspect, alone or in combination with one or more of the first through twenty-second aspects, the measurement time indication comprises an SMTC indication corresponding to at least one frequency associated with the at least one inter-frequency neighbor cell.

In a twenty-fourth aspect, alone or in combination with the twenty-third aspect, the SMTC indication indicates a list of cell identifiers corresponding to at least one applicable neighbor cell, wherein the at least one applicable neighbor cell comprises the at least one inter-frequency neighbor cell.

In a twenty-fifth aspect, alone or in combination with the twenty-third aspect, the SMTC indication indicates a time offset associated with a configured SMTC window.

In a twenty-sixth aspect, alone or in combination with the twenty-third aspect, the SMTC indication indicates SSB numerology information associated with at least one applicable neighbor cell.

In a twenty-seventh aspect, alone or in combination with one or more of the first through twenty-sixth aspects, process 600 includes receiving a SMTC indication corresponding to at least one frequency associated with the at least one inter-frequency neighbor cell.

In a twenty-eighth aspect, alone or in combination with the twenty-seventh aspect, the measurement time indication comprises the SMTC indication.

In a twenty-ninth aspect, alone or in combination with one or more of the first through twenty-eighth aspects, the measurement time indication comprises an RS measurement indication corresponding to at least one frequency associated with the at least one inter-frequency neighbor cell.

In a thirtieth aspect, alone or in combination with the twenty-ninth aspect, the RS measurement indication indicates a list of cell identifiers corresponding to at least one applicable neighbor cell, wherein the at least one applicable neighbor cell comprises the at least one inter-frequency neighbor cell.

In a thirty-first aspect, alone or in combination with one or more of the first through thirtieth aspects, process 600 includes receiving an RS measurement indication corresponding to at least one frequency associated with the at least one inter-frequency neighbor cell.

In a thirty-second aspect, alone or in combination with the thirty-first aspect, the measurement time indication comprises the RS measurement indication.

In a thirty-third aspect, alone or in combination with one or more of the first through thirty-second aspects, the measurement time indication comprises an RMTC indication corresponding to at least one frequency associated with the at least one inter-frequency neighbor cell.

In a thirty-fourth aspect, alone or in combination with the thirty-third aspect, the RMTC indication indicates a list of cell identifiers corresponding to at least one applicable neighbor cell, wherein the at least one applicable neighbor cell comprises the at least one inter-frequency neighbor cell.

In a thirty-fifth aspect, alone or in combination with the thirty-third aspect, the RMTC indication indicates a time offset associated with a configured RMTC window.

In a thirty-sixth aspect, alone or in combination with the thirty-third aspect, the RMTC indication indicates CSI-RS numerology information associated with at least one applicable neighbor cell.

In a thirty-seventh aspect, alone or in combination with one or more of the first through thirty-sixth aspects, process 600 includes receiving a RMTC indication corresponding to at least one frequency associated with the at least one inter-frequency neighbor cell.

In a thirty-eighth aspect, alone or in combination with the thirty-seventh aspect, the measurement time indication comprises the RMTC indication.

In a thirty-ninth aspect, alone or in combination with one or more of the first through thirty-eighth aspects, the measurement time indication is carried using a RACH procedure message associated with a RACH procedure, the RACH procedure message comprising at least one of a RAR message, or an RRC connection setup message.

In a fortieth aspect, alone or in combination with the thirty-ninth aspect, the measurement time indication comprises a timer configured to allow measuring the at least one signal during the RACH procedure.

In a forty-first aspect, alone or in combination with the thirty-ninth aspect, the measurement time indication indicates a time period for measurement, and wherein the time period for measurement corresponds to an offset time.

In a forty-second aspect, alone or in combination with the forty-first aspect, the offset time comprises a round-trip delay associated with a signal.

In a forty-third aspect, alone or in combination with the forty-first aspect, the offset time comprises a gap between a first RACH message and a second RACH message.

In a forty-fourth aspect, alone or in combination with the thirty-ninth aspect, the measurement time indication indicates at least one of an SMTC or an RMTC.

In a forty-fifth aspect, alone or in combination with one or more of the first through forty-fourth aspects, the measurement time indication indicates at least one of a list of cell identifiers corresponding to the at least one inter-frequency neighbor cell, a frequency corresponding to the at least one inter-frequency neighbor cell, or a possible synchronization signal block location corresponding to the at least one inter-frequency neighbor cell.

In a forty-sixth aspect, alone or in combination with one or more of the first through forty-fifth aspects, process 600 includes searching the at least one inter-frequency neighbor cell for the at least one signal, determining a measurement time parameter based at least in part on searching the at least one inter-frequency neighbor cell, wherein the measurement time parameter comprises at least one of an adjustment corresponding to a configured measurement gap, or an SMTC corresponding to a configured measurement gap, and transmitting an indication of the measurement time parameter to the wireless communication device that provides the serving cell.

In a forty-seventh aspect, alone or in combination with the forty-sixth aspect, transmitting the indication of the measurement time parameter comprises transmitting the indication of the measurement time parameter in an acknowledgment message, wherein the measurement time indication is based at least in part on the measurement time parameter.

In a forty-eighth aspect, alone or in combination with the forty-sixth aspect, process 600 includes transmitting an acknowledgment message, wherein the acknowledgment message indicates a report status associated with the indication of the measurement time.

In a forty-ninth aspect, alone or in combination with the forty-sixth aspect, process 600 includes detecting at least one of a synchronization signal block associated with the at least one inter-frequency neighbor cell or a reference signal associated with the at least one inter-frequency neighbor cell, and transmitting an indication of a list of cell identifiers corresponding to the at least one inter-frequency neighbor cell, wherein the measurement time indication is based at least in part on the list of cell identifiers.

In a fiftieth aspect, alone or in combination with one or more of the first through forty-ninth aspects, process 600 includes transmitting an indication of a differential delay of the at least one inter-frequency neighbor cell relative to the serving cell, wherein the measurement time indication is based at least in part on the differential delay.

In a fifty-first aspect, alone or in combination with one or more of the first through fiftieth aspects, at least one of the serving cell or the at least one inter-frequency neighbor cell is associated with an NTN.

In a fifty-second aspect, alone or in combination with one or more of the first through fifty-first aspects, the measurement time indication indicates a plurality of measurement gap configurations.

In a fifty-third aspect, alone or in combination with the fifty-second aspect, the measurement time indication indicates at least one of a periodic schedule or a duty cycle associated with using one or more of the plurality of measurement gap configurations.

In a fifty-fourth aspect, alone or in combination with one or more of the first through fifty-third aspects, the measurement time indication indicates one or more MGTAs.

In a fifty-fifth aspect, alone or in combination with the fifty-fourth aspect, the measurement time indication indicates at least one of a periodic schedule or a duty cycle associated with applying one or more of the one or more MGTAs.

In a fifty-sixth aspect, alone or in combination with one or more of the first through fifty-fifth aspects, the measurement time indication indicates a new SMTC configuration that includes an offset value comprising at least one of a positive offset value or a negative offset value, wherein the offset value is associated with an SMTC window for one or more neighbor cells associated with a frequency.

In a fifty-seventh aspect, alone or in combination with the fifty-sixth aspect, the offset value corresponds to a differential delay of the one or more neighbor cells.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
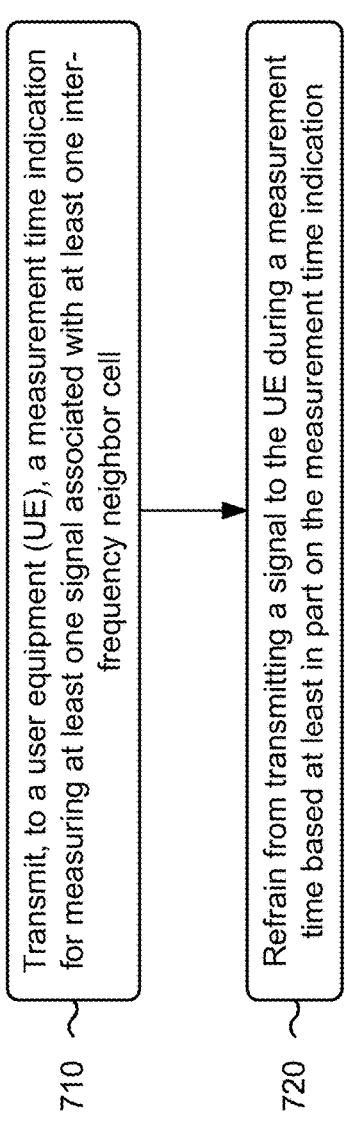

FIG. 7 is a diagram illustrating an example process 700 performed, for example, by a wireless communication device, in accordance with the present disclosure. Example process 700 is an example where the wireless communication device (e.g., wireless communication device 505 shown in FIG. 5) performs operations associated with measurement time indications.

As shown in FIG. 7, in some aspects, process 700 may include transmitting, to a UE that is served by a serving cell provided by the wireless communication device, a measurement time indication for measuring at least one signal associated with at least one inter-frequency neighbor cell (block 710). For example, the wireless communication device (e.g., using transmission component 1006, depicted in FIG. 10) may transmit, to a UE that is served by a serving cell provided by the wireless communication device, a measurement time indication for measuring at least one signal associated with at least one inter-frequency neighbor cell, as described above.

As further shown in FIG. 7, in some aspects, process 700 may include refraining from transmitting a signal to the UE during a measurement time based at least in part on the measurement time indication (block 720). For example, the wireless communication device (e.g., using communication manager 1004 shown in FIG. 10) may refrain from transmitting a signal to the UE during a measurement time based at least in part on the measurement time indication, as described above.

Process 700 may include additional aspects, such as any single aspect or any combination of aspects described below and/or in connection with one or more other processes described elsewhere herein.

In a first aspect, the at least one signal comprises at least one of an SSB, or a CSI-RS.

In a second aspect, alone or in combination with the first aspect, the at least one signal associated with the at least one inter-frequency neighbor cell comprises a plurality of signals associated with a plurality of inter-frequency neighbor cells.

In a third aspect, alone or in combination with one or more of the first and second aspects, the measurement time indication is carried using at least one of an RRC message, a DCI transmission, or a MAC-CE.

In a fourth aspect, alone or in combination with one or more of the first through third aspects, the measurement time indication indicates a scheduled measurement gap that overrides a configured measurement gap.

In a fifth aspect, alone or in combination with one or more of the first through third aspects, the measurement time indication indicates a measurement gap of a plurality of configured measurement gaps.

In a sixth aspect, alone or in combination with one or more of the first through third aspects, the measurement time indication indicates an adjustment to a configured measurement gap.

In a seventh aspect, alone or in combination with the sixth aspect, the measurement time indication indicates a time offset associated with the configured measurement gap.

In an eighth aspect, alone or in combination with one or more of the first through seventh aspects, process 700 includes transmitting a measurement request, wherein the measurement time indication comprises a scheduling indication corresponding to the measurement request.

In a ninth aspect, alone or in combination with the eighth aspect, the measurement request indicates at least one of a cell ID corresponding to the at least one inter-frequency neighbor cell, or a frequency corresponding to the at least one inter-frequency neighbor cell.

In a tenth aspect, alone or in combination with the eighth aspect, the scheduling indication is carried in a scheduling DCI transmission.

In an eleventh aspect, alone or in combination with the eighth aspect, the scheduling indication comprises an indication to perform a measurement during an offset time.

In a twelfth aspect, alone or in combination with the eleventh aspect, the offset time comprises a round-trip delay associated with a signal.

In a thirteenth aspect, alone or in combination with one or more of the first through twelfth aspects, process 700 includes transmitting a measurement gap configuration that indicates a first measurement gap, and wherein the measurement time indication comprises an indication of a second measurement gap that is different than the first measurement gap.

In a fourteenth aspect, alone or in combination with one or more of the first through thirteenth aspects, the indication of the second measurement gap is carried in a scheduling DCI transmission.

In a fifteenth aspect, alone or in combination with the fourteenth aspect, the indication of the second measurement gap comprises an indication to provide the second measurement gap during an offset time.

In a sixteenth aspect, alone or in combination with the fifteenth aspect, the offset time comprises a round-trip delay associated with a signal.

In a seventeenth aspect, alone or in combination with one or more of the first through sixteenth aspects, the measurement time indication indicates an adjustment to a default measurement gap.

In an eighteenth aspect, alone or in combination with the seventeenth aspect, the default measurement gap is indicated by a wireless communication specification.

In a nineteenth aspect, alone or in combination with the seventeenth aspect, the default measurement gap comprises a common configuration associated with at least one of a non-terrestrial device that provides the at least one inter-frequency neighbor cell, or the at least one neighbor cell.

In a twentieth aspect, alone or in combination with the nineteenth aspect, process 700 includes transmitting the common configuration.

In a twenty-first aspect, alone or in combination with the twentieth aspect, the common configuration is carried using a SIB.

In a twenty-second aspect, alone or in combination with one or more of the first through twenty-first aspects, the measurement time indication indicates a time offset associated with the default measurement gap.

In a twenty-third aspect, alone or in combination with one or more of the first through twenty-second aspects, the measurement time indication comprises an SMTC indication corresponding to at least one frequency associated with the at least one inter-frequency neighbor cell.

In a twenty-fourth aspect, alone or in combination with the twenty-third aspect, the SMTC indication indicates a list of cell IDs corresponding to at least one applicable neighbor cell, wherein the at least one applicable neighbor cell comprises the at least one inter-frequency neighbor cell.

In a twenty-fifth aspect, alone or in combination with the twenty-third aspect, the SMTC indication indicates a time offset associated with a configured SMTC window.

In a twenty-sixth aspect, alone or in combination with the twenty-third aspect, the SMTC indication indicates SSB numerology information associated with at least one applicable neighbor cell.

In a twenty-seventh aspect, alone or in combination with the twenty-third aspect, process 700 includes transmitting a SMTC indication corresponding to at least one frequency associated with the at least one inter-frequency neighbor cell.

In a twenty-eighth aspect, alone or in combination with the twenty-seventh aspect, the measurement time indication comprises the SMTC indication.

In a twenty-ninth aspect, alone or in combination with one or more of the first through twenty-eighth aspects, the measurement time indication comprises an RS measurement indication corresponding to at least one frequency associated with the at least one inter-frequency neighbor cell.

In a thirtieth aspect, alone or in combination with the twenty-ninth aspect, the RS measurement indication indicates a list of cell identifiers corresponding to at least one applicable neighbor cell, wherein the at least one applicable neighbor cell comprises the at least one inter-frequency neighbor cell.

In a thirty-first aspect, alone or in combination with the thirty-first aspect, process 700 includes transmitting a RS measurement indication corresponding to at least one frequency associated with the at least one inter-frequency neighbor cell.

In a thirty-second aspect, alone or in combination with one or more of the first through thirty-first aspects, the measurement time indication comprises the RS measurement indication.

In a thirty-third aspect, alone or in combination with one or more of the first through thirty-second aspects, the measurement time indication comprises an RMTC indication corresponding to at least one frequency associated with the at least one inter-frequency neighbor cell.

In a thirty-fourth aspect, alone or in combination with the thirty-third aspect, the RMTC indication indicates a list of cell IDs corresponding to at least one applicable neighbor cell, wherein the at least one applicable neighbor cell comprises the at least one inter-frequency neighbor cell.

In a thirty-fifth aspect, alone or in combination with the thirty-third aspect, the RMTC indication indicates a time offset associated with a configured RMTC window.

In a thirty-sixth aspect, alone or in combination with the thirty-third aspect, the RMTC indication indicates channel state information reference signal numerology information associated with at least one applicable neighbor cell.

In a thirty-seventh aspect, alone or in combination with one or more of the first through thirty-sixth aspects, process 700 includes transmitting a RMTC indication corresponding to at least one frequency associated with the at least one inter-frequency neighbor cell.

In a thirty-eighth aspect, alone or in combination with the thirty-seventh aspect, the measurement time indication comprises the RMTC indication.

In a thirty-ninth aspect, alone or in combination with one or more of the first through thirty-eighth aspects, the measurement time indication is carried using a RACH procedure message associated with a RACH procedure, the RACH procedure message comprising at least one of an RAR message, or a radio resource control connection setup message.

In a fortieth aspect, alone or in combination with the thirty-ninth aspect, the measurement time indication comprises a timer configured to allow measuring the at least one signal during the RACH procedure.

In a forty-first aspect, alone or in combination with the thirty-ninth aspect, the measurement time indication indicates a time period for measurement, and wherein the time period for measurement corresponds to an offset time.

In a forty-second aspect, alone or in combination with the forty-first aspect, the offset time comprises a round-trip delay associated with a signal.

In a forty-third aspect, alone or in combination with the forty-first aspect, the offset time comprises a gap between a first RACH message and a second RACH message.

In a forty-fourth aspect, alone or in combination with one or more of the first through forty-third aspects, the measurement time indication indicates at least one of an SMTC or an RMTC.

In a forty-fifth aspect, alone or in combination with one or more of the first through forty-fourth aspects, the measurement time indication indicates at least one of a list of cell identifiers corresponding to the at least one inter-frequency neighbor cell, a frequency corresponding to the at least one inter-frequency neighbor cell, or a possible synchronization signal block location corresponding to the at least one inter-frequency neighbor cell.

In a forty-sixth aspect, alone or in combination with one or more of the first through forty-fifth aspects, process 700 includes receiving an indication of a measurement time parameter, wherein the measurement time parameter is based at least in part on a search of the at least one inter-frequency neighbor cell, wherein the measurement time parameter comprises at least one of an adjustment corresponding to a configured measurement gap, or an SMTC corresponding to a configured measurement gap.

In a forty-seventh aspect, alone or in combination with the forty-sixth aspect, receiving the indication of the measurement time parameter comprises receiving the indication of the measurement time parameter in an acknowledgment message, wherein the measurement time indication is based at least in part on the measurement time parameter.

In a forty-eighth aspect, alone or in combination with the forty-sixth aspect, process 700 includes receiving an acknowledgment message, wherein the acknowledgment message indicates a report status associated with the indication of the measurement time.

In a forty-ninth aspect, alone or in combination with the forty-sixth aspect, process 700 includes receiving an indication of a list of cell IDs corresponding to the at least one inter-frequency neighbor cell and based at least in part on a detection of at least one of an SSB associated with the at least one inter-frequency neighbor cell or a reference signal associated with the at least one inter-frequency neighbor cell, wherein the measurement time indication is based at least in part on the list of cell IDs.

In a fiftieth aspect, alone or in combination with one or more of the first through forty-ninth aspects, process 700 includes receiving an indication of a differential delay of the at least one inter-frequency neighbor cell relative to the serving cell, wherein the measurement time indication is based at least in part on the differential delay.

In a fifty-first aspect, alone or in combination with one or more of the first through fiftieth aspects, at least one of the serving cell or the at least one inter-frequency neighbor cell is associated with an NTN.

In a fifty-second aspect, alone or in combination with one or more of the first through fifty-first aspects, the measurement time indication indicates a plurality of measurement gap configurations.

In a fifty-third aspect, alone or in combination with the fifty-second aspect, the measurement time indication indicates at least one of a periodic schedule or a duty cycle associated with using one or more of the plurality of measurement gap configurations.

In a fifty-fourth aspect, alone or in combination with one or more of the first through fifty-third aspects, the measurement time indication indicates one or more MGTAs.

In a fifty-fifth aspect, alone or in combination with the fifty-fourth aspect, the measurement time indication indicates at least one of a periodic schedule or a duty cycle associated with applying one or more of the one or more MGTAs.

In a fifty-sixth aspect, alone or in combination with one or more of the first through fifty-fifth aspects, the measurement time indication indicates a new SMTC configuration that includes an offset value comprising at least one of a positive offset value or a negative offset value, wherein the offset value is associated with an SMTC window for one or more neighbor cells associated with a frequency.

In a fifty-seventh aspect, alone or in combination with the fifty-sixth aspect, the offset value corresponds to a differential delay of the one or more neighbor cells.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
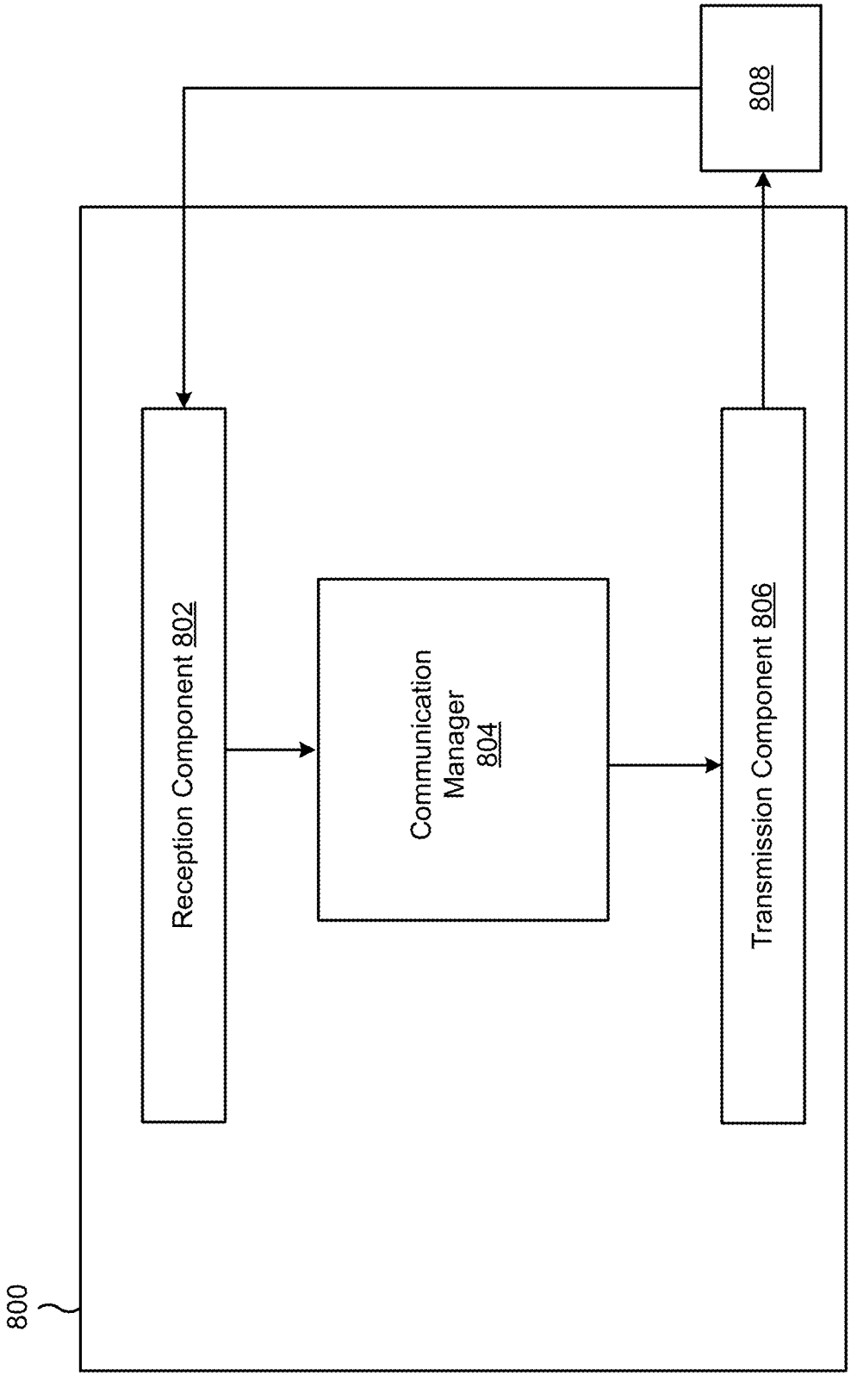
FIGS. 8-11 are block diagrams of example apparatuses for wireless communication, in accordance with the present disclosure.

FIG. 8 is a block diagram of an example apparatus 800 for wireless communication in accordance with the present disclosure. The apparatus 800 may be, be similar to, include, or be included in a UE (e.g., wireless communication device 510 shown in FIG. 5). In some aspects, the apparatus 800 includes a reception component 802, a communication manager 804, and a transmission component 806, which may be in communication with one another (for example, via one or more buses). As shown, the apparatus 800 may communicate with another apparatus 808 (such as a client, a server, a UE, a base station, or another wireless communication device) using the reception component 802 and the transmission component 806.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 may include one or more components of the first UE described above in connection with FIG. 2.

The reception component 802 may provide means for receiving communications, such as reference signals, control information, data communications, or a combination thereof, from the apparatus 808. The reception component 802 may provide received communications to one or more other components of the apparatus 800, such as the communication manager 804. In some aspects, the reception component 802 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the first UE described above in connection with FIG. 2.

The transmission component 806 may provide means for transmitting communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may provide means for performing signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the first UE described above in connection with FIG. 2. In some aspects, the transmission component 806 may be co-located with the reception component 802 in a transceiver.

In some aspects, the communication manager 804 may provide means for receiving, from a base station that provides a serving cell, a measurement time indication for measuring at least one signal associated with at least one inter-frequency neighbor cell; and receiving the at least one signal associated with the at least one inter-frequency neighbor cell based at least in part on the measurement time indication. In some aspects, the communication manager 804 may include a controller/processor, a memory, or a combination thereof, of the first UE described above in connection with FIG. 2. In some aspects, the communication manager 804 may include the reception component 802, and/or the transmission component 806, among other examples. In some aspects, the means provided by the communication manager 804 may include, or be included within, means provided by the reception component 802, and/or the transmission component 806, among other examples.

In some aspects, the communication manager 804 and/or one or more components of the communication manager 804 may include or may be implemented within hardware (e.g., one or more of the circuitry described in connection with FIG. 2). In some aspects, the communication manager 804 and/or one or more components thereof may include or may be implemented within a controller/processor, a memory, or a combination thereof, of the UE 120 described above in connection with FIG. 2.

In some aspects, the communication manager 804 and/or one or more components of the communication manager 804 may be implemented in code (e.g., as software or firmware stored in a memory). For example, the communication manager 804 and/or a component (or a portion of a component) of the communication manager 804 may be implemented as instructions or code stored in a non-transitory computer-readable medium and executable by a controller or a processor to perform the functions or operations of the communication manager 804 and/or the component. If implemented in code, the functions of the communication manager 804 and/or a component may be executed by a controller/processor, a memory, a scheduler, a communication unit, or a combination thereof, of the UE 120 described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
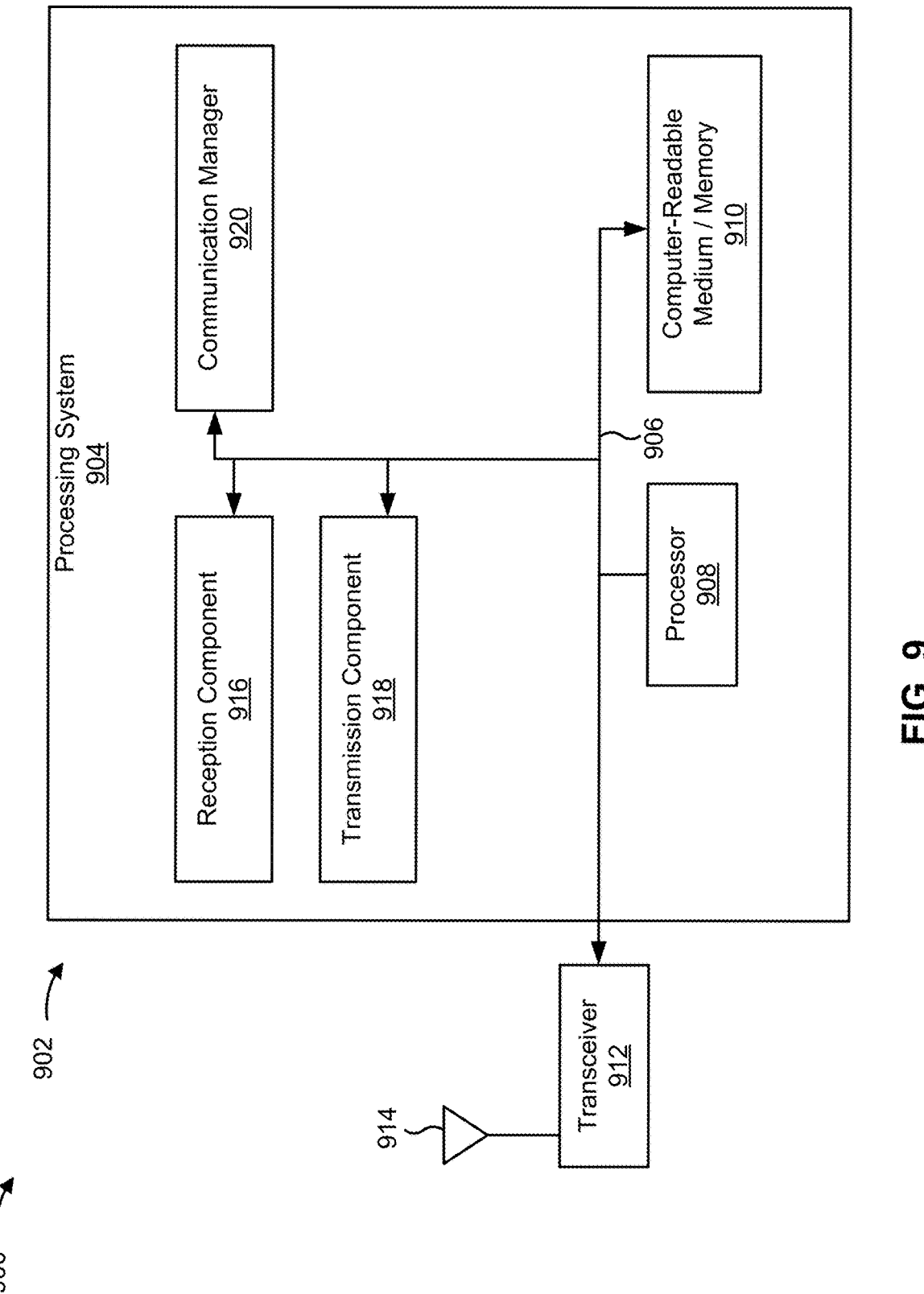

FIG. 9 is a diagram illustrating an example 900 of a hardware implementation for an apparatus 902 employing a processing system 904. The apparatus 902 may be, be similar to, include, or be included in the apparatus 800 shown in FIG. 8.

The processing system 904 may be implemented with a bus architecture, represented generally by the bus 906. The bus 906 may include any number of interconnecting buses and bridges depending on the specific application of the processing system 904 and the overall design constraints. The bus 906 links together various circuits including one or more processors and/or hardware components, represented by a processor 908, the illustrated components, and the computer-readable medium/memory 910. The bus 906 may also link various other circuits, such as timing sources, peripherals, voltage regulators, and/or power management circuits, among other examples.

The processing system 904 may be coupled to a transceiver 912. The transceiver 912 is coupled to one or more antennas 914. The transceiver 912 provides a means for communicating with various other apparatuses over a transmission medium. The transceiver 912 receives a signal from the one or more antennas 914, extracts information from the received signal, and provides the extracted information to the processing system 904, specifically a reception component 916. In addition, the transceiver 912 receives information from the processing system 904, specifically a transmission component 918, and generates a signal to be applied to the one or more antennas 914 based at least in part on the received information. The processing system may include a communication manager 920 configured to manage one or more operations associated with communications described herein.

The processor 908 is coupled to the computer-readable medium/memory 910. The processor 908 is responsible for general processing, including the execution of software stored on the computer-readable medium/memory 910. The software, when executed by the processor 908, causes the processing system 904 to perform the various functions described herein in connection with a client. The computer-readable medium/memory 910 may also be used for storing data that is manipulated by the processor 908 when executing software. The processing system 904 may include any number of additional components not illustrated in FIG. 9. The components illustrated and/or not illustrated may be software modules running in the processor 908, resident/stored in the computer readable medium/memory 910, one or more hardware modules coupled to the processor 908, or some combination thereof.

In some aspects, the processing system 904 may be a component of the UE 120 and may include the memory 282 and/or at least one of the TX MIMO processor 266, the receive (RX) processor 258, and/or the controller/processor 280. In some aspects, the apparatus 902 for wireless communication provides means for receiving, from a base station that provides a serving cell, a measurement time indication for measuring at least one signal associated with at least one inter-frequency neighbor cell; and receiving the at least one signal associated with the at least one inter-frequency neighbor cell based at least in part on the measurement time indication. The aforementioned means may be one or more of the aforementioned components of the processing system 904 of the apparatus 902 configured to perform the functions recited by the aforementioned means. As described elsewhere herein, the processing system 904 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 9 is provided as an example. Other examples may differ from what is described in connection with FIG. 9.

Figure 10:
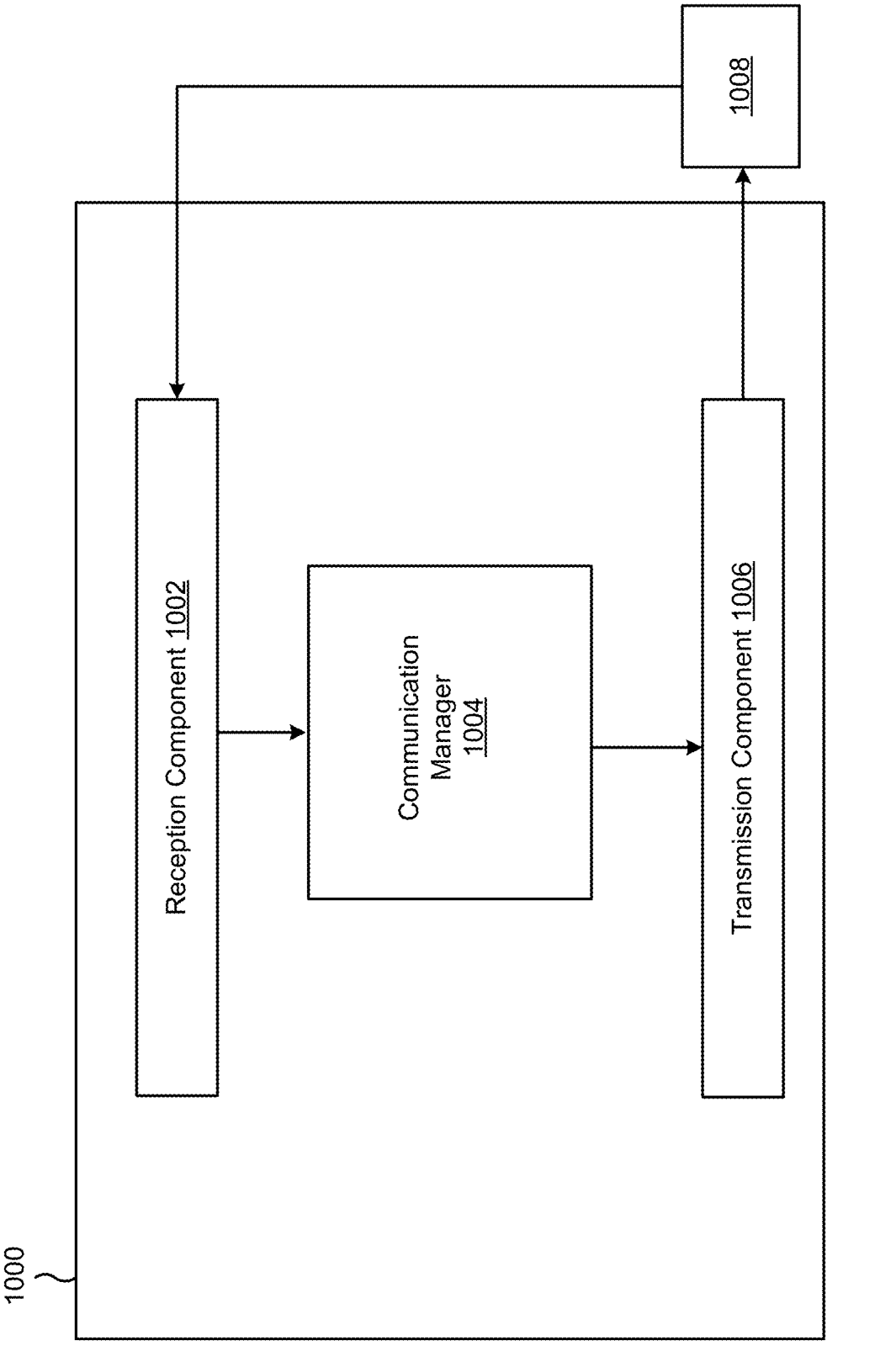

FIG. 10 is a block diagram of an example apparatus 1000 for wireless communication in accordance with the present disclosure. The apparatus 1000 may be, be similar to, include, or be included in a wireless communication device (e.g., wireless communication device 505 shown in FIG. 5). In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a client, a server, a UE, a base station, or another wireless communication device) using the reception component 1002 and the transmission component 1006.

In some aspects, the apparatus 1000 may be configured to perform one or more operations described herein in connection with FIG. 5. Additionally, or alternatively, the apparatus 1000 may be configured to perform one or more processes described herein, such as process 700 of FIG. 7. In some aspects, the apparatus 1000 may include one or more components of the base station described above in connection with FIG. 2.

The reception component 1002 may provide means for receiving communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the base station described above in connection with FIG. 2.

The transmission component 1006 may provide means for transmitting communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may provide means for performing signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the base station described above in connection with FIG. 2. In some aspects, the transmission component 1006 may be co-located with the reception component 1002 in a transceiver.

The communication manager 1004 may provide means for transmitting, to a UE that is served by a serving cell provided by the wireless communication device, a measurement time indication for measuring at least one signal associated with at least one inter-frequency neighbor cell; and refraining from transmitting a signal to the UE during a measurement time based at least in part on the measurement time indication. In some aspects, the communication manager 1004 may include a controller/processor, a memory, a scheduler, a communication unit, or a combination thereof, of the base station described above in connection with FIG. 2. In some aspects, the communication manager 1004 may include the reception component 1002 and/or the transmission component 1006, among other examples. In some aspects, the means provided by the communication manager 1004 may include, or be included within means provided by the reception component 1002 and/or the transmission component 1006, among other examples.

In some aspects, the communication manager 1004 and/or one or more components thereof may include or may be implemented within hardware. In some aspects, the communication manager 1004 and/or one or more components thereof may include or may be implemented within a controller/processor, a memory, or a combination thereof, of the BS 110 described above in connection with FIG. 2.

In some aspects, the communication manager 1004 and/or one or more components thereof may be implemented in code (e.g., as software or firmware stored in a memory). For example, the communication manager 1004 and/or a component (or a portion of a component) of the communication manager 1004 may be implemented as instructions or code stored in a non-transitory computer-readable medium and executable by a controller or a processor to perform the functions or operations of the communication manager 1004 and/or the component. If implemented in code, the functions of the communication manager 1004 and/or a component may be executed by a controller/processor, a memory, a scheduler, a communication unit, or a combination thereof, of the BS 110 described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
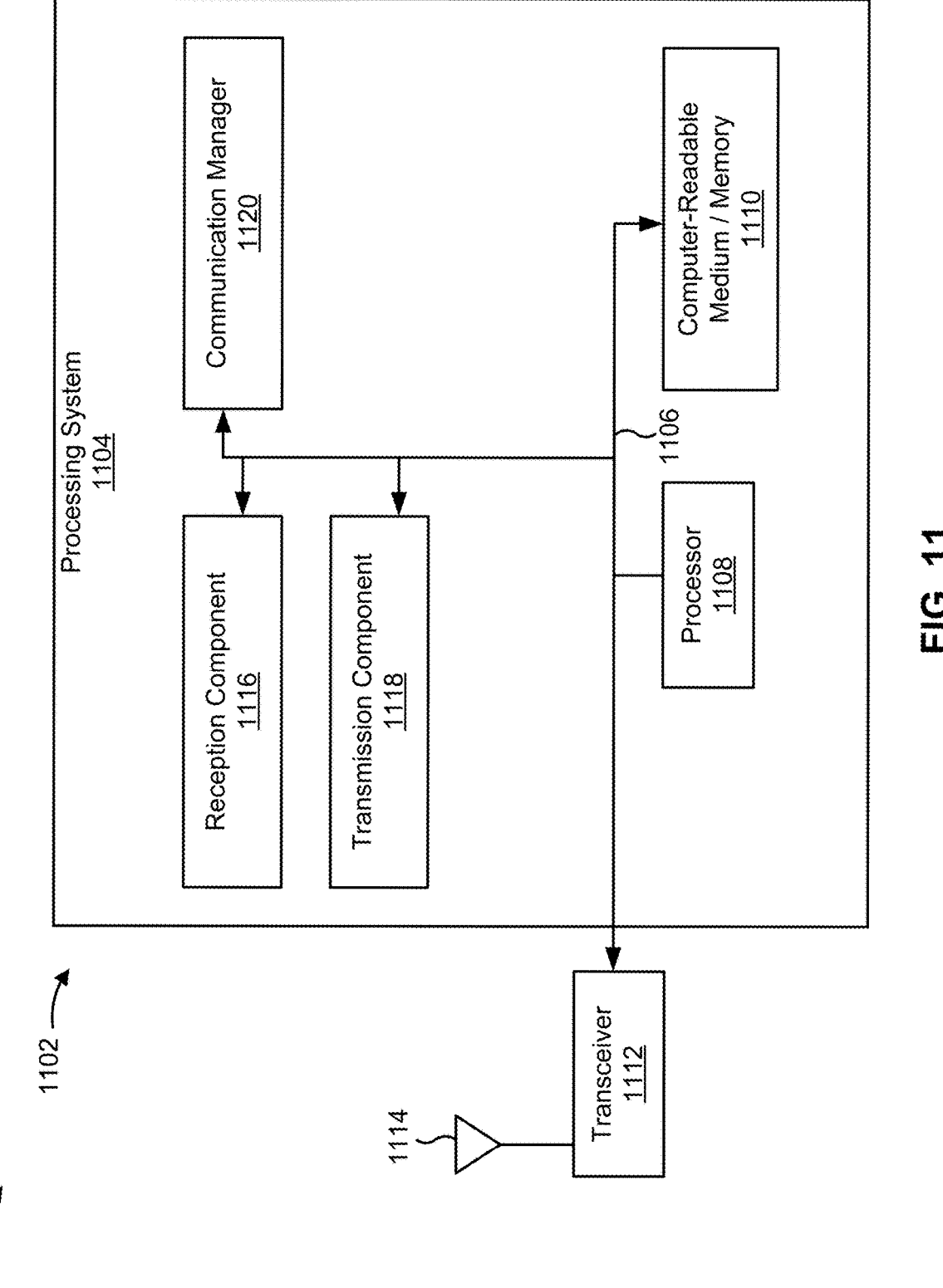

FIG. 11 is a diagram illustrating an example 1100 of a hardware implementation for an apparatus 1102 employing a processing system 1104. The apparatus 1102 may be, be similar to, include, or be included in the apparatus 1000 shown in FIG. 10.

The processing system 1104 may be implemented with a bus architecture, represented generally by the bus 1106. The bus 1106 may include any number of interconnecting buses and bridges depending on the specific application of the processing system 1104 and the overall design constraints. The bus 1106 links together various circuits including one or more processors and/or hardware components, represented by a processor 1108, the illustrated components, and the computer-readable medium/memory 1110. The bus 1106 may also link various other circuits, such as timing sources, peripherals, voltage regulators, and/or power management circuits, among other examples.

The processing system 1104 may be coupled to a transceiver 1112. The transceiver 1112 is coupled to one or more antennas 1114. The transceiver 1112 provides a means for communicating with various other apparatuses over a transmission medium. The transceiver 1112 receives a signal from the one or more antennas 1114, extracts information from the received signal, and provides the extracted information to the processing system 1104, specifically a reception component 1116. In addition, the transceiver 1112 receives information from the processing system 1104, specifically a transmission component 1118, and generates a signal to be applied to the one or more antennas 1114 based at least in part on the received information. The processing system 1104 may include a communication manager 1120 configured to manage one or more operations associated with communications described herein.

The processor 1108 is coupled to the computer-readable medium/memory 1110.

The processor 1108 is responsible for general processing, including the execution of software stored on the computer-readable medium/memory 1110. The software, when executed by the processor 1108, causes the processing system 1104 to perform the various functions described herein in connection with a server. The computer-readable medium/memory 1110 may also be used for storing data that is manipulated by the processor 1108 when executing software. The processing system 1104 may include any number of additional components not illustrated in FIG. 11. The components illustrated and/or not illustrated may be software modules running in the processor 1108, resident/stored in the computer readable medium/memory 1110, one or more hardware modules coupled to the processor 1108, or some combination thereof.

In some aspects, the processing system 1104 may be a component of the UE 120 and may include the memory 282 and/or at least one of the TX MIMO processor 266, the RX processor 258, and/or the controller/processor 280. In some aspects, the apparatus 1102 for wireless communication provides means for transmitting, to a UE that is served by a serving cell provided by the wireless communication device, a measurement time indication for measuring at least one signal associated with at least one inter-frequency neighbor cell; and refraining from transmitting a signal to the UE during a measurement time based at least in part on the measurement time indication. The aforementioned means may be one or more of the aforementioned components of the processing system 1104 of the apparatus 1102 configured to perform the functions recited by the aforementioned means. As described elsewhere herein, the processing system 1104 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

The following provides an overview of some Aspects of the present disclosure:

Aspect 1: A method of wireless communication performed by a user equipment (UE), comprising: receiving, from a wireless communication device, a measurement time indication for measuring at least one signal associated with at least one inter-frequency neighbor cell; and receiving the at least one signal associated with the at least one inter-frequency neighbor cell based at least in part on the measurement time indication.

Aspect 2: The method of Aspect 1, wherein the at least one signal comprises at least one of: a synchronization signal block, or a channel state interference reference signal.

Aspect 3: The method of either of Aspects 1 or 2, wherein the at least one signal associated with the at least one inter-frequency neighbor cell comprises a plurality of signals associated with a plurality of inter-frequency neighbor cells.

Aspect 4: The method of any of Aspects 1-3, wherein the measurement time indication is carried using at least one of: a radio resource control message, a downlink control information transmission, or a medium access control (MAC) control element.

Aspect 5: The method of any of Aspects 1-4, wherein the measurement time indication indicates a scheduled measurement gap that overrides a configured measurement gap.

Aspect 6: The method of any of Aspects 1-4, wherein the measurement time indication indicates a measurement gap of a plurality of configured measurement gaps.

Aspect 7: The method of any of Aspects 1-4, wherein the measurement time indication indicates an adjustment to a configured measurement gap.

Aspect 8: The method of Aspect 7, wherein the measurement time indication indicates a time advance associated with the configured measurement gap.

Aspect 9: The method of Aspect 1, further comprising receiving a measurement request, wherein the measurement time indication comprises a scheduling indication corresponding to the measurement request.

Aspect 10: The method of Aspect 9, wherein the measurement request indicates at least one of: a cell identifier corresponding to the at least one inter-frequency neighbor cell, or a frequency corresponding to the at least one inter-frequency neighbor cell.

Aspect 11: The method of either of Aspects 9 or 10, wherein the scheduling indication is carried in a scheduling downlink control information transmission.

Aspect 12: The method of any of Aspects 9-11, wherein the scheduling indication comprises an indication to perform a measurement during an offset time.

Aspect 13: The method of Aspect 12, wherein the offset time comprises a round-trip delay associated with a signal.

Aspect 14: The method of Aspect 1, further comprising receiving a measurement gap configuration that indicates a first measurement gap, and wherein the measurement time indication comprises an indication of a second measurement gap that is different than the first measurement gap.

Aspect 15: The method of Aspect 14, wherein the indication of the second measurement gap is carried in a scheduling downlink control information transmission.

Aspect 16: The method of Aspect 15, wherein the indication of the second measurement gap comprises an indication to provide the second measurement gap during an offset time.

Aspect 17: The method of Aspect 16, wherein the offset time comprises a round-trip delay associated with a signal.

Aspect 18: The method of Aspect 1, wherein the measurement time indication indicates an adjustment to a default measurement gap.

Aspect 19: The method of Aspect 18, wherein the default measurement gap is indicated by a wireless communication specification.

Aspect 20: The method of either of Aspects 18 or 19, wherein the default measurement comprises a common configuration associated with at least one of: a nonterrestrial device that provides the at least one inter-frequency neighbor cell, or the at least one neighbor cell.

Aspect 21: The method of Aspect 20, further comprising receiving the common configuration.

Aspect 22: The method of Aspect 21, wherein the common configuration is carried using a system information block.

Aspect 23: The method of Aspect 18, wherein the measurement time indication indicates a time offset associated with the default measurement gap.

Aspect 24: The method of Aspect 1, wherein the measurement time indication comprises a synchronization signal block (SSB) measurement timing configuration (SMTC) indication corresponding to at least one frequency associated with the at least one inter-frequency neighbor cell.

Aspect 25: The method of Aspect 24, wherein the SMTC indication indicates a list of cell identifiers corresponding to at least one applicable neighbor cell, wherein the at least one applicable neighbor cell comprises the at least one inter-frequency neighbor cell.

Aspect 26: The method of either of Aspects 24 or 25, wherein the SMTC indication indicates a time offset associated with a configured SMTC window.

Aspect 27: The method of any of Aspects 24-26, wherein the SMTC indication indicates SSB numerology information associated with at least one applicable neighbor cell.

Aspect 28: The method of any of Aspects 1-27, further comprising receiving a synchronization signal block (SSB) measurement timing configuration (SMTC) indication corresponding to at least one frequency associated with the at least one inter-frequency neighbor cell.

Aspect 29: The method of Aspect 28, wherein the measurement time indication comprises the SMTC indication.

Aspect 30: The method of Aspect 1, wherein the measurement time indication comprises a reference signal (RS) measurement indication corresponding to at least one frequency associated with the at least one inter-frequency neighbor cell.

Aspect 31: The method of Aspect 30, wherein the RS measurement indication indicates a list of cell identifiers corresponding to at least one applicable neighbor cell, wherein the at least one applicable neighbor cell comprises the at least one inter-frequency neighbor cell.

Aspect 32: The method of any of Aspects 1-31, further comprising receiving a reference signal strength (RS) measurement indication corresponding to at least one frequency associated with the at least one inter-frequency neighbor cell.

Aspect 33: The method of Aspect 32, wherein the measurement time indication comprises the RS measurement indication.

Aspect 34: The method of any of Aspects 1-33, wherein the measurement time indication comprises a received signal strength indicator (RSSI) measurement timing configuration (RMTC) indication corresponding to at least one frequency associated with the at least one inter-frequency neighbor cell.

Aspect 35: The method of Aspect 34, wherein the RMTC indication indicates a list of cell identifiers corresponding to at least one applicable neighbor cell, wherein the at least one applicable neighbor cell comprises the at least one inter-frequency neighbor cell.

Aspect 36: The method of either of Aspects 34 or 35, wherein the RMTC indication indicates a time offset associated with a configured RMTC window.

Aspect 37: The method of any of Aspects 34-36, wherein the RMTC indication indicates channel state information reference signal numerology information associated with at least one applicable neighbor cell.

Aspect 38: The method of any of Aspects 1-37, further comprising receiving a received signal strength indicator (RSSI) measurement timing configuration (RMTC) indication corresponding to at least one frequency associated with the at least one inter-frequency neighbor cell.

Aspect 39: The method of Aspect 38, wherein the measurement time indication comprises the RMTC indication.

Aspect 40: The method of any of Aspects 1-39, wherein the measurement time indication is carried using a random access channel (RACH) procedure message associated with a RACH procedure, the RACH procedure message comprising at least one of: a random access response (RAR) message, or a radio resource control connection setup message.

Aspect 41: The method of Aspect 40, wherein the measurement time indication comprises a timer configured to allow measuring the at least one signal during the RACH procedure.

Aspect 42: The method of Aspect 40, wherein the measurement time indication indicates a time period for measurement, and wherein the time period for measurement corresponds to an offset time.

Aspect 43: The method of Aspect 42, wherein the offset time comprises a round-trip delay associated with a signal.

Aspect 44: The method of Aspect 42, wherein the offset time comprises a gap between a first RACH message and a second RACH message.

Aspect 45: The method of Aspect 40, wherein the measurement time indication indicates at least one of: a synchronization signal block (SSB) measurement time configuration (SMTC), or a received signal strength indicator measurement time configuration (RMTC).

Aspect 46: The method of any of Aspects 1-45, wherein the measurement time indication indicates at least one of: a list of cell identifiers corresponding to the at least one inter-frequency neighbor cell, a frequency corresponding to the at least one inter-frequency neighbor cell, or a possible synchronization signal block location corresponding to the at least one inter-frequency neighbor cell.

Aspect 47: The method of any of Aspects 1-46, further comprising: searching the at least one inter-frequency neighbor cell for the at least one signal; determining a measurement time parameter based at least in part on searching the at least one inter-frequency neighbor cell, wherein the measurement time parameter comprises at least one of: an adjustment corresponding to a configured measurement gap, or a synchronization signal block (SSB) measurement time configuration (SMTC) corresponding to a configured measurement gap; and transmitting an indication of the measurement time parameter.

Aspect 48: The method of Aspect 47, wherein transmitting the indication of the measurement time parameter comprises transmitting the indication of the measurement time parameter in an acknowledgment message, wherein the measurement time indication is based at least in part on the measurement time parameter.

Aspect 49: The method of Aspect 47, further comprising transmitting an acknowledgment message, wherein the acknowledgment message indicates a report status associated with the indication of the measurement time.

Aspect 50: The method of Aspect 47, further comprising: detecting at least one of a synchronization signal block associated with the at least one inter-frequency neighbor cell or a reference signal associated with the at least one inter-frequency neighbor cell; and transmitting an indication of a list of cell identifiers corresponding to the at least one inter-frequency neighbor cell, wherein the measurement time indication is based at least in part on the list of cell identifiers.

Aspect 51: The method of any of Aspects 1-50, further comprising transmitting an indication of a differential delay of the at least one inter-frequency neighbor cell relative to a serving cell, wherein the measurement time indication is based at least in part on the differential delay.

Aspect 52: The method of any of Aspects 1-51, wherein at least one of a serving cell or the at least one inter-frequency neighbor cell is associated with a non-terrestrial network.

Aspect 53: The method of any of Aspects 1-52, wherein the measurement time indication indicates a plurality of measurement gap configurations.

Aspect 54: The method of Aspect 53, wherein the measurement time indication indicates at least one of a periodic schedule or a duty cycle, wherein the at least one of the periodic schedule or the duty cycle is associated with using one or more of the plurality of measurement gap configurations.

Aspect 55: The method of any of Aspects 1-54, wherein the measurement time indication indicates one or more measurement gap timing advances (MGTAs).

Aspect 56: The method of Aspect 55, wherein the measurement time indication indicates at least one of a periodic schedule or a duty cycle, wherein the at least one of the periodic schedule or the duty cycle is associated with applying one or more of the one or more MGTAs.

Aspect 57: The method of any of Aspects 1-56, wherein the measurement time indication indicates a new synchronization signal block (SSB) measurement time configuration (SMTC) configuration that includes an offset value comprising at least one of a positive offset value or a negative offset value, wherein the offset value is associated with an SMTC window for one or more neighbor cells associated with a frequency.

Aspect 58: The method of Aspect 57, wherein the offset value corresponds to a differential delay of the one or more neighbor cells.

Aspect 59: A method of wireless communication performed by a wireless communication device, comprising: transmitting, to a user equipment (UE), a measurement time indication for measuring at least one signal associated with at least one inter-frequency neighbor cell; and refraining from transmitting a signal to the UE during a measurement time based at least in part on the measurement time indication.

Aspect 60: The method of Aspect 59, wherein the at least one signal comprises at least one of: a synchronization signal block, or a channel state interference reference signal.

Aspect 61: The method of either of Aspects 59 or 60, wherein the at least one signal associated with the at least one inter-frequency neighbor cell comprises a plurality of signals associated with a plurality of inter-frequency neighbor cells.

Aspect 62: The method of any of Aspects 59-61, wherein the measurement time indication is carried using at least one of: a radio resource control message, a downlink control information transmission, or a medium access control (MAC) control element.

Aspect 63: The method of any of Aspects 59-62, wherein the measurement time indication indicates a scheduled measurement gap that overrides a configured measurement gap.

Aspect 64: The method of any of Aspects 59-62, wherein the measurement time indication indicates a measurement gap of a plurality of configured measurement gaps.

Aspect 65: The method of any of Aspects 59-62, wherein the measurement time indication indicates an adjustment to a configured measurement gap.

Aspect 66: The method of Aspect 65, wherein the measurement time indication indicates a time advance associated with the configured measurement gap.

Aspect 67: The method of Aspect 59, further comprising transmitting a measurement request, wherein the measurement time indication comprises a scheduling indication corresponding to the measurement request.

Aspect 68: The method of Aspect 67, wherein the measurement request indicates at least one of: a cell identifier corresponding to the at least one inter-frequency neighbor cell, or a frequency corresponding to the at least one inter-frequency neighbor cell.

Aspect 69: The method of either of Aspects 67 or 68, wherein the scheduling indication is carried in a scheduling downlink control information transmission.

Aspect 70: The method of any of Aspects 67-69, wherein the scheduling indication comprises an indication to perform a measurement during an offset time.

Aspect 71: The method of Aspect 70, wherein the offset time comprises a round-trip delay associated with a signal.

Aspect 72: The method of Aspect 59, further comprising transmitting a measurement gap configuration that indicates a first measurement gap, and wherein the measurement time indication comprises an indication of a second measurement gap that is different than the first measurement gap.

Aspect 73: The method of Aspect 72, wherein the indication of the second measurement gap is carried in a scheduling downlink control information transmission.

Aspect 74: The method of Aspect 73, wherein the indication of the second measurement gap comprises an indication to provide the second measurement gap during an offset time.

Aspect 75: The method of Aspect 74, wherein the offset time comprises a round-trip delay associated with a signal.

Aspect 76: The method of Aspect 59, wherein the measurement time indication indicates an adjustment to a default measurement gap.

Aspect 77: The method of Aspect 76, wherein the default measurement gap is indicated by a wireless communication specification.

Aspect 78: The method of either of Aspects 76 or 77, wherein the default measurement gap comprises a common configuration associated with at least one of: a non-terrestrial device that provides the at least one inter-frequency neighbor cell, or the at least one neighbor cell.

Aspect 79: The method of Aspect 78, further comprising transmitting the common configuration.

Aspect 80: The method of Aspect 79, wherein the common configuration is carried using a system information block.

Aspect 81: The method of Aspect 76, wherein the measurement time indication indicates a time offset associated with the default measurement gap.

Aspect 82: The method of Aspect 59, wherein the measurement time indication comprises a synchronization signal block (SSB) measurement timing configuration (SMTC) indication corresponding to at least one frequency associated with the at least one inter-frequency neighbor cell.

Aspect 83: The method of Aspect 82, wherein the SMTC indication indicates a list of cell identifiers corresponding to at least one applicable neighbor cell, wherein the at least one applicable neighbor cell comprises the at least one inter-frequency neighbor cell.

Aspect 84: The method of either of Aspects 82 or 83, wherein the SMTC indication indicates a time offset associated with a configured SMTC window.

Aspect 85: The method of any of Aspects 82-84, wherein the SMTC indication indicates SSB numerology information associated with at least one applicable neighbor cell.

Aspect 86: The method of any of Aspects 59-85, further comprising transmitting a synchronization signal block (SSB) measurement timing configuration (SMTC) indication corresponding to at least one frequency associated with the at least one inter-frequency neighbor cell.

Aspect 87: The method of Aspect 86, wherein the measurement time indication comprises the SMTC indication.

Aspect 88: The method of Aspect 59, wherein the measurement time indication comprises a reference signal (RS) measurement indication corresponding to at least one frequency associated with the at least one inter-frequency neighbor cell.

Aspect 89: The method of Aspect 88, wherein the RS measurement indication indicates a list of cell identifiers corresponding to at least one applicable neighbor cell, wherein the at least one applicable neighbor cell comprises the at least one inter-frequency neighbor cell.

Aspect 90: The method of any of Aspects 59-89, further comprising transmitting a reference signal (RS) measurement indication corresponding to at least one frequency associated with the at least one inter-frequency neighbor cell.

Aspect 91: The method of Aspect 90, wherein the measurement time indication comprises the RS measurement indication.

Aspect 92: The method of any of Aspects 89-91, wherein the measurement time indication comprises a received signal strength indicator (RSSI) measurement timing configuration (RMTC) indication corresponding to at least one frequency associated with the at least one inter-frequency neighbor cell.

Aspect 93: The method of Aspect 92, wherein the RMTC indication indicates a list of cell identifiers corresponding to at least one applicable neighbor cell, wherein the at least one applicable neighbor cell comprises the at least one inter-frequency neighbor cell.

Aspect 94: The method of either of Aspects 92 or 93, wherein the RMTC indication indicates a time offset associated with a configured RMTC window.

Aspect 95: The method of any of Aspects 92-94, wherein the RMTC indication indicates channel state information reference signal numerology information associated with at least one applicable neighbor cell.

Aspect 96: The method of any of Aspects 59-95, further comprising transmitting a received signal strength indicator (RSSI) measurement timing configuration (RMTC) indication corresponding to at least one frequency associated with the at least one inter-frequency neighbor cell.

Aspect 97: The method of Aspect 96, wherein the measurement time indication comprises the RMTC indication.

Aspect 98: The method of any of Aspects 59-97, wherein the measurement time indication is carried using a random access channel (RACH) procedure message associated with a RACH procedure, the RACH procedure message comprising at least one of: a random access response (RAR) message, or a radio resource control connection setup message.

Aspect 99: The method of Aspect 98, wherein the measurement time indication comprises a timer configured to allow measuring the at least one signal during the RACH procedure.

Aspect 100: The method of Aspect 99, wherein the measurement time indication indicates a time period for measurement, and wherein the time period for measurement corresponds to an offset time.

Aspect 101: The method of Aspect 100, wherein the offset time comprises a round-trip delay associated with a signal.

Aspect 102: The method of Aspect 100, wherein the offset time comprises a gap between a first RACH message and a second RACH message.

Aspect 103: The method of Aspect 100, wherein the measurement time indication indicates at least one of: a synchronization signal block (SSB) measurement time configuration (SMTC), or a received signal strength indicator measurement time configuration (RMTC).

Aspect 104: The method of any of Aspects 59-103, wherein the measurement time indication indicates at least one of: a list of cell identifiers corresponding to the at least one inter-frequency neighbor cell, a frequency corresponding to the at least one inter-frequency neighbor cell, or a possible synchronization signal block location corresponding to the at least one inter-frequency neighbor cell.

Aspect 105: The method of any of Aspects 59-104, further comprising receiving an indication of a measurement time parameter, wherein the measurement time parameter is based at least in part on a search of the at least one inter-frequency neighbor cell, wherein the measurement time parameter comprises at least one of: an adjustment corresponding to a configured measurement gap, or a synchronization signal block (SSB) measurement time configuration (SMTC) corresponding to a configured measurement gap.

Aspect 106: The method of Aspect 105, wherein receiving the indication of the measurement time parameter comprises receiving the indication of the measurement time parameter in an acknowledgment message, wherein the measurement time indication is based at least in part on the measurement time parameter.

Aspect 107: The method of Aspect 105, further comprising receiving an acknowledgment message, wherein the acknowledgment message indicates a report status associated with the indication of the measurement time.

Aspect 108: The method of Aspect 105, further comprising: receiving an indication of a list of cell identifiers corresponding to the at least one inter-frequency neighbor cell and based at least in part on a detection of at least one of a synchronization signal block associated with the at least one inter-frequency neighbor cell or a reference signal associated with the at least one inter-frequency neighbor cell, wherein the measurement time indication is based at least in part on the list of cell identifiers.

Aspect 109: The method of any of Aspects 59-108, further comprising receiving an indication of a differential delay of the at least one inter-frequency neighbor cell relative to a serving cell, wherein the measurement time indication is based at least in part on the differential delay.

Aspect 110: The method of any of Aspects 59-109, wherein at least one of a serving cell or the at least one inter-frequency neighbor cell is associated with a non-terrestrial network.

Aspect 111: The method of any of Aspects 59-110, wherein the measurement time indication indicates a plurality of measurement gap configurations.

Aspect 112: The method of Aspect 111, wherein the measurement time indication indicates at least one of a periodic schedule or a duty cycle, wherein the at least one of the periodic schedule or the duty cycle is associated with using one or more of the plurality of measurement gap configurations.

Aspect 113: The method of any of Aspects 59-112, wherein the measurement time indication indicates one or more measurement gap timing advances (MGTAs).

Aspect 114: The method of Aspect 113, wherein the measurement time indication indicates at least one of a periodic schedule or a duty cycle, wherein the at least one of the periodic schedule or the duty cycle is associated with applying one or more of the one or more MGTAs.

Aspect 115: The method of any of Aspects 59-114, wherein the measurement time indication indicates a new synchronization signal block (SSB) measurement time configuration (SMTC) configuration that includes an offset value comprising at least one of a positive offset value or a negative offset value, wherein the offset value is associated with an SMTC window for one or more neighbor cells associated with a frequency.

Aspect 116: The method of Aspect 115, wherein the offset value corresponds to a differential delay of the one or more neighbor cells.

Aspect 117: An apparatus for wireless communication at a device, comprising a processor; memory coupled with the processor; and instructions stored in the memory and executable by the processor to cause the apparatus to perform the method of one or more of Aspects 1-58.

Aspect 118: A device for wireless communication, comprising a memory and one or more processors coupled to the memory, the one or more processors configured to perform the method of one or more of Aspects 1-58.

Aspect 119: An apparatus for wireless communication, comprising at least one means for performing the method of one or more of Aspects 1-58.

Aspect 120: A non-transitory computer-readable medium storing code for wireless communication, the code comprising instructions executable by a processor to perform the method of one or more of Aspects 1-58.

Aspect 121: A non-transitory computer-readable medium storing a set of instructions for wireless communication, the set of instructions comprising one or more instructions that, when executed by one or more processors of a device, cause the device to perform the method of one or more of Aspects 1-58.

Aspect 122: An apparatus for wireless communication at a device, comprising a processor; memory coupled with the processor; and instructions stored in the memory and executable by the processor to cause the apparatus to perform the method of one or more of Aspects 59-116.

Aspect 123: A device for wireless communication, comprising a memory and one or more processors coupled to the memory, the one or more processors configured to perform the method of one or more of Aspects 59-116.

Aspect 124: An apparatus for wireless communication, comprising at least one means for performing the method of one or more of Aspects 59-116.

Aspect 125: A non-transitory computer-readable medium storing code for wireless communication, the code comprising instructions executable by a processor to perform the method of one or more of Aspects 59-116.

Aspect 126: A non-transitory computer-readable medium storing a set of instructions for wireless communication, the set of instructions comprising one or more instructions that, when executed by one or more processors of a device, cause the device to perform the method of one or more of Aspects 59-116.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising: one or more memories comprising instructions; and one or more processors configured to execute the instructions to cause the apparatus to:
   obtain, in a downlink control information (DCI) or a medium access control (MAC) control element (MAC-CE), an indication that indicates:
      a measurement request, a schedule corresponding to the measurement request, or both; and
      a measurement window, wherein the measurement window is associated with one or more cells of a non-terrestrial device; and
   obtain, based at least in part on the measurement window and the measurement request, at least one signal associated with at least one inter-frequency neighbor cell of the non-terrestrial device.

2. The apparatus of claim 1,
wherein the at least one signal comprises at least one of:
   a synchronization signal block, or
   a channel state interference reference signal.

3. The apparatus of claim 1,
wherein the one or more processors are further configured to execute the instructions to cause the apparatus to obtain a configuration that also indicates the measurement window.

4. The apparatus of claim 1,
wherein the one or more processors are further configured to execute the instructions to cause the apparatus to obtain a measurement gap configuration that indicates a first measurement gap, and
   wherein the measurement window indicated in the indication is a second measurement gap that is different than the first measurement gap.

5. The apparatus of claim 1,
wherein the measurement window is an adjustment to a default measurement gap.

6. The apparatus of claim 1,
wherein the indication further indicates at least one of:
   a plurality of measurement gap configurations, or
   at least one of a periodic schedule or a duty cycle, the at least one of the periodic schedule or the duty cycle being associated with using one or more of the plurality of measurement gap configurations.

7. The apparatus of claim 1,
wherein the indication further indicates at least one of:
   one or more measurement gap timing advances (MG-TAs), or
   at least one of a periodic schedule or a duty cycle, the at least one of the periodic schedule or the duty cycle being associated with applying one or more of the one or more MGTAs.

8. The apparatus of claim 1,
wherein the measurement window is a synchronization signal block (SSB) measurement timing configuration (SMTC) window corresponding to at least one frequency associated with the at least one inter-frequency neighbor cell.

9. The apparatus of claim 1,
wherein the one or more processors are further configured to execute the instructions to cause the apparatus to obtain a synchronization signal block (SSB) measurement timing configuration (SMTC) indication corresponding to at least one frequency associated with the at least one inter-frequency neighbor cell.

10. The apparatus of claim 1,
wherein the DCI or the MAC-CE further indicates a timer configured to allow measuring the at least one signal during a random access channel procedure.

11. The apparatus of claim 1,
wherein the indication further indicates a time period that includes the measurement window, and wherein the time period corresponds to an offset time.

12. The apparatus of claim 11,
wherein the offset time comprises a gap between a first random access channel (RACH) message and a second RACH message.

13. The apparatus of claim 1,
wherein the measurement window is one of:
   a synchronization signal block (SSB) measurement time configuration (SMTC) window, or
   a received signal strength indicator measurement time configuration (RMTC) window.

14. The apparatus of claim 1,
wherein the indication further indicates at least one of:
   a list of cell identifiers corresponding to the at least one inter-frequency neighbor cell,
   a frequency corresponding to the at least one inter-frequency neighbor cell,
   a possible synchronization signal block location corresponding to the at least one inter-frequency neighbor cell, or
   a new synchronization signal block (SSB) measurement time configuration (SMTC), wherein the measurement window includes an offset value comprising a positive offset value or a negative offset value, wherein the offset value is associated with an SMTC window, the offset value corresponding to a differential delay of the at least one inter-frequency neighbor cell.

15. The apparatus of claim 1,
wherein the one or more processors are further configured to execute the instructions to cause the apparatus to:
   search the at least one inter-frequency neighbor cell for the at least one signal, wherein a measurement time parameter, that is based at least in part on the at least one inter-frequency neighbor cell, comprises a synchronization signal block (SSB) measurement time configuration (SMTC) corresponding to the measurement window; and
   transmit an indication of the measurement time parameter.

16. The apparatus of claim 15,
wherein the one or more processors are further configured to execute the instructions to cause the apparatus to output, for transmission, an acknowledgment message, wherein the acknowledgment message indicates a report status associated with the indication.

17. The apparatus of claim 1,
wherein the one or more processors are further configured to execute the instructions to cause the apparatus to output, for transmission, an indication of a differential delay of the at least one inter-frequency neighbor cell relative to a serving cell.

18. The apparatus of claim 1, further comprising
at least one transceiver configured to receive the indication and the one signal, wherein the apparatus is configured as a user equipment (UE).

19. The apparatus of claim 1, wherein the measurement window is a first measurement window of a plurality of measurement windows, wherein the plurality of configured measurement windows comprise at least one configured measurement window that is a repeating measurement window and another configured measurement window that is different than the at least one configured measurement window.

20. An apparatus for wireless communication, comprising:
one or more memories comprising instructions; and
one or more processors configured to execute the instructions to cause the apparatus to:
output, for transmission in a downlink control information (DCI) or a medium access control (MAC) control element (MAC-CE), an indication that indicates:
a measurement request, a schedule corresponding to the measurement request, or both; and
a measurement window, wherein the measurement window is associated with one or more cells of a non-terrestrial device; and
refrain from outputting, for transmission during a measurement time based at least in part on the measurement window and the measurement request, at least one signal associated with at least one inter-frequency neighbor cell of the non-terrestrial device.

21. The apparatus of claim 20,
wherein the indication further indicates at least one of:
a list of cell identifiers corresponding to the at least one inter-frequency neighbor cell,
a frequency corresponding to the at least one inter-frequency neighbor cell, or
a possible synchronization signal block location corresponding to the at least one inter-frequency neighbor cell.

22. The apparatus of claim 20,
wherein the one or more processors are further configured to execute the instructions to cause the apparatus to:
output, for transmission, a configuration that indicates the measurement window; and
obtain an indication of a parameter, wherein the parameter is based at least in part on a search of the at least one inter-frequency neighbor cell, wherein the parameter comprises a synchronization signal block (SSB) measurement time configuration (SMTC) corresponding to the measurement window.

23. The apparatus of claim 20,
wherein the one or more processors are further configured to execute the instructions to cause the apparatus to obtain an indication of a differential delay of the one inter-frequency neighbor cell relative to a serving cell.

24. The apparatus of claim 20, further comprising
at least one transceiver configured to transmit the indication, wherein the apparatus is configured as a non-terrestrial network entity.

25. The apparatus of claim 20,
wherein the one or more processors are further configured to execute the instructions to cause the apparatus to output, for transmission, a measurement gap configuration that indicates a first measurement gap, and
wherein the measurement window is a second measurement gap that is different than the first measurement gap.

26. The apparatus of claim 20,
wherein the measurement window is an adjustment to a default measurement gap.

27. The apparatus of claim 20,
wherein the indication further indicates at least one of:
a plurality of measurement gap configurations, or
at least one of a periodic schedule or a duty cycle, the at least one of the periodic schedule or the duty cycle being associated with using one or more of the plurality of measurement gap configurations.

28. The apparatus of claim 20,
wherein the indication further indicates at least one of:
one or more measurement gap timing advances (MGTAs), or
at least one of a periodic schedule or a duty cycle, the at least one of the periodic schedule or the duty cycle being associated with applying one or more of the one or more MGTAs.

29. The apparatus of claim 20, wherein the measurement window is a first measurement window of a plurality of measurement windows, wherein the plurality of configured measurement windows comprise at least one configured measurement window that is a repeating measurement window and another configured measurement window that is different than the at least one configured measurement window.

30. A method of wireless communication performed by a user equipment (UE), comprising:
receiving, in a downlink control information (DCI) or a medium access control (MAC) control element (MAC-CE), an indication that indicates:
a measurement request, a schedule corresponding to the measurement request, or both; and
a measurement window, wherein the measurement window is associated with one or more cells of a non-terrestrial device; and
receiving, based at least in part on the measurement window and the measurement request, at least one signal associated with at least one inter-frequency neighbor cell of the non-terrestrial device.

* * * * *